United States Patent
Huang et al.

(10) Patent No.: US 9,942,055 B2
(45) Date of Patent: Apr. 10, 2018

(54) APPARATUS, SYSTEM AND METHOD OF MULTICAST COMMUNICATION

(71) Applicant: INTEL IP CORPORATION, Santa Clara, CA (US)

(72) Inventors: Po-Kai Huang, Santa Clara, CA (US); Emily H. Qi, Camas, WA (US); Robert Stacey, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 94 days.

(21) Appl. No.: 14/864,911

(22) Filed: Sep. 25, 2015

(65) Prior Publication Data
US 2016/0241411 A1    Aug. 18, 2016

Related U.S. Application Data

(60) Provisional application No. 62/115,276, filed on Feb. 12, 2015.

(51) Int. Cl.
| | |
|---|---|
| *H04H 20/71* | (2008.01) |
| *H04L 12/18* | (2006.01) |
| *H04L 1/16* | (2006.01) |
| *H04L 1/18* | (2006.01) |
| *H04L 1/00* | (2006.01) |

(52) U.S. Cl.
CPC .......... *H04L 12/189* (2013.01); *H04L 1/1614* (2013.01); *H04L 1/1685* (2013.01); *H04L 1/1858* (2013.01); *H04L 1/1861* (2013.01); *H04L 2001/0092* (2013.01)

(58) Field of Classification Search
CPC .. H04H 20/71; H04W 72/0406; H04W 4/005; H04L 45/74; H04L 12/189; H04L 1/1614; H04L 1/1858
USPC .......................................................... 370/312
See application file for complete search history.

(56) References Cited

U.S. PATENT DOCUMENTS

| | | | |
|---|---|---|---|
| 8,885,495 B1 | 11/2014 | Liu et al. | |
| 2005/0058116 A1* | 3/2005 | Palin .................. | H04L 1/18 370/345 |
| 2009/0279470 A1 | 11/2009 | Seok | |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Chi H Pham
*Assistant Examiner* — Alexander O Boakye
(74) *Attorney, Agent, or Firm* — Shichrur & Co.

(57) ABSTRACT

Some demonstrative embodiments include apparatuses, systems and/or methods of multicast communication. For example, an apparatus may include circuitry configured to cause a wireless device to process transmission of a multicast transmission to a plurality of devices; and to process reception of at least one Multi-User (MU) acknowledgement transmission from two or more devices of the plurality of devices, the MU acknowledgement transmission to acknowledge receipt of the multicast transmission by the two or more devices.

25 Claims, 10 Drawing Sheets

(56) References Cited

U.S. PATENT DOCUMENTS

| | | |
|---|---|---|
| 2011/0158159 A1* | 6/2011 | Gong .................... H04L 1/1685 370/328 |
| 2011/0225440 A1 | 9/2011 | Kwon et al. |
| 2013/0229996 A1 | 9/2013 | Wang et al. |
| 2014/0036757 A1 | 2/2014 | Kim et al. |

OTHER PUBLICATIONS

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.
Wi-Fi Peer-to-Peer (P2P), Technical Specification, Version 1.5, 2014, Aug. 4, 2014, 183 pages.
International Search Report and Written Opinion for PCT/US2016/012953, dated Apr. 25, 2016, 12 pages.
International Preliminary Report on Patentability for PCT /US2016/012953, dated Aug. 24, 2017, 8 pages.

* cited by examiner

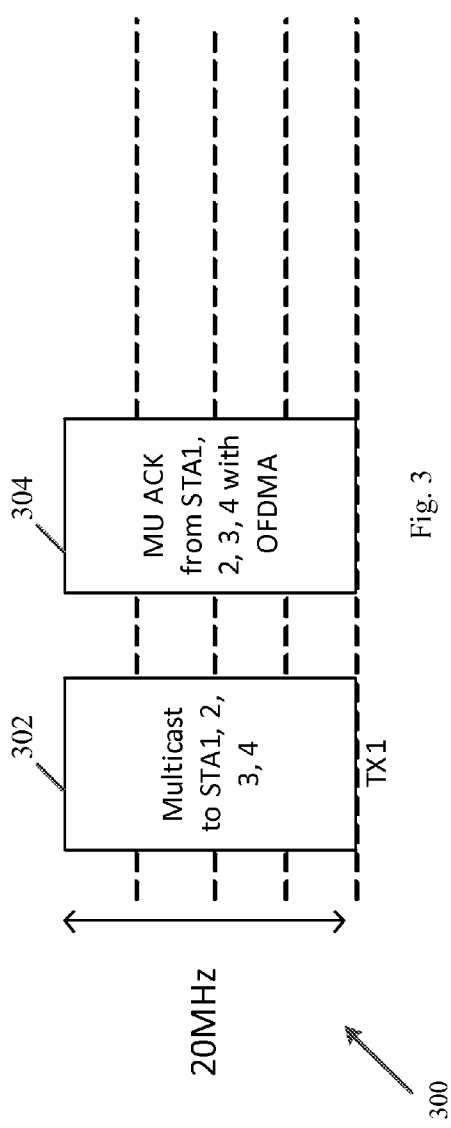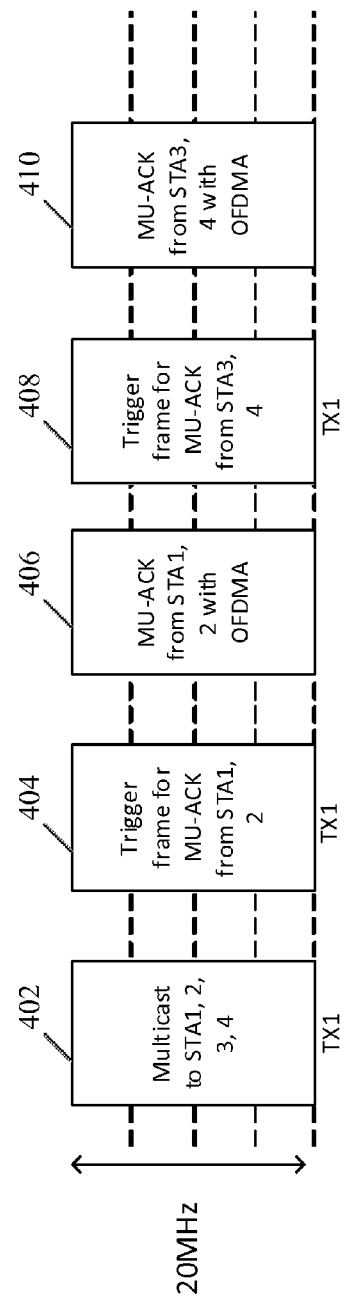

US 9,942,055 B2

APPARATUS, SYSTEM AND METHOD OF MULTICAST COMMUNICATION

CROSS REFERENCE

This application claims the benefit of and priority from U.S. Provisional Patent Application No. 62/115,276 entitled "Apparatus, System and Method of Multicast Communication", filed Feb. 12, 2015, the entire disclosure of which is incorporated herein by reference.

TECHNICAL FIELD

Embodiments described herein generally relate to multicast communication.

BACKGROUND

Multicast transmission is a technique that may be implemented, for example, to provide higher efficiency, e.g., compared to separate unicast transmission.

In order to achieve an increased efficiency using a multicast transmission, it may be required to ensure reliable multicast transmission. Specifically, the transmitter of a multicast transmission may need to know, which stations do not receive the transmission, e.g., so that any required retransmission can be performed.

There is a need for a multicast communication scheme, which may be configured to provide efficient communication, e.g., while achieving a high level of reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3 is a schematic illustration of a multicast communication sequence, in accordance with some demonstrative embodiments.

FIG. 4 is a schematic illustration of a multicast communication sequence, in accordance with some demonstrative embodiments.

DETAILED DESCRIPTION

Figure 1:
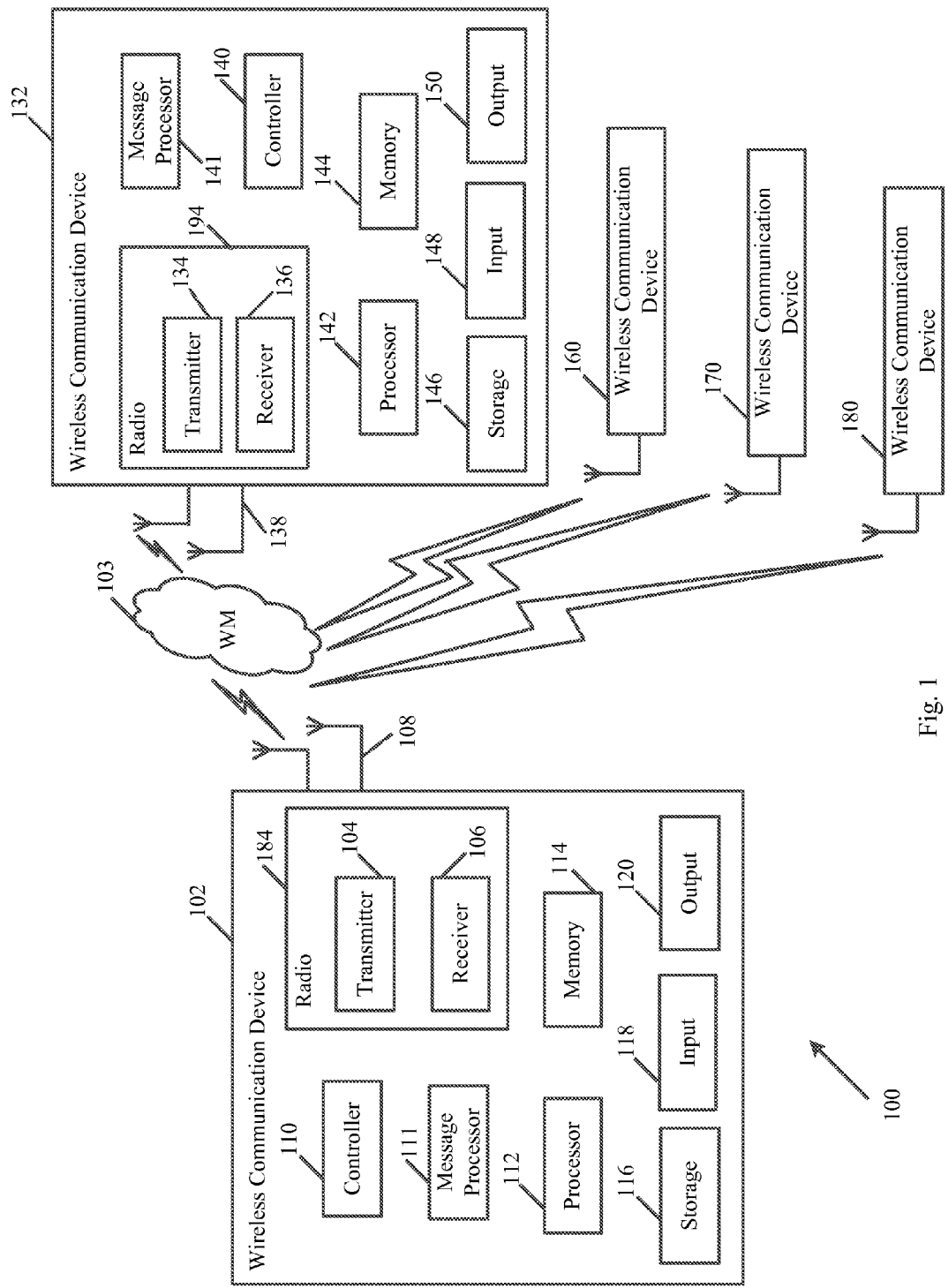
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012); IEEE802.11ac-2013 ("*IEEE P*802.11*ac-*2013*, IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 4: Enhancements for Very High Throughput for Operation in Bands below 6 *GHz*", December, 2013); IEEE 802.11ad ("*IEEE P*802.11*ad-*2012*, IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band*", 28 December, 2012); IEEE-802.11REVmc ("*IEEE* 802.11*-REVmc™/D*3.0*, June* 2014 *draft standard for Information technology—Telecommunications and information exchange between systems Local and metropolitan area networks Specific requirements; Part* 11: *Wireless LAN Medium Access Control* (*MAC*) *and Physical Layer* (*PHY*) *Specification*"); IEEE 802.11 ax (*IEEE* 802.11*ax, High Efficiency WLAN* (*HEW*)); IEEE802.11-ay (*P*802.1l*ay Standard for Information Technology—Telecommunications and Information Exchange Between Systems Local and Metropolitan Area Networks—Specific Requirements Part* 11: *Wireless LAN Medium Access Control* (*MAC*) *and Physical Layer* (*PHY*) *Specifications—Amendment: Enhanced Throughput for Operation in License-Exempt Bands Above* 45 *GHz*)) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1*, April* 2011*, Final specification*) and/or future versions and/or derivatives thereof, devices and/or networks operating in accordance with existing Wireless Fidelity (WiFi) Alliance (WFA) Peer-to-Peer (P2P) specifications (*WiFi P*2*P technical specification, version* 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, multi-radio devices, cellular radio-telephone communication systems, a User Equipment (UE), a mobile device, a wireless station (STA), an access terminal, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, a Mobile Internet Device (MID), or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), Multi-User (MU) MIMO (MU-MIMO), Single Carrier Frequency-Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), BT, BLE, Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wi-Fi or WiFi network, or a WLAN according to the IEEE 802 Standards (also referred to as "the 802 network"). Other embodiments may be used in conjunction with any other suitable wireless communication network, for example, a wireless area network, a "piconet", a WPAN, a WVAN and the like.

Some demonstrative embodiments may be used in conjunction with a LTE cellular network. However, other embodiments may be used in conjunction with any other suitable cellular network, e.g., a 3G cellular network, a 4G cellular network, a 5G cellular network, a WiMax cellular network, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to WiFi communication, e.g., in accordance with a WiFi standard. However, other embodiments may be implemented with respect to any other communication scheme, network, standard and/or protocol.

Reference is now made to FIG. 1, which schematically illustrates a block diagram of a system 100, in accordance with some demonstrative embodiments.

In some demonstrative embodiments, system 100 may include a wireless communication network including one or more wireless communication devices, e.g., wireless communication devices 102, 132, 160, 170, and/or 180, capable of communicating content, data, information and/or signals over a wireless medium 103.

In some demonstrative embodiments, wireless medium 103 may include, for example, a radio channel, a cellular channel, an RF channel, a WLAN channel, a Wireless Fidelity (WiFi) channel, an IR channel, and the like. One or more elements of system 100 may optionally be capable of communicating over any suitable wired communication links.

In some demonstrative embodiments, wireless communication devices 102, 132, 160, 170, and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, a sensor device, an Internet of Things (IoT) device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, system 100 may include one or more stations, for example, including one or more AP stations (AP STA) and/or one or more non-AP stations, e.g., client STAs. In one example, device 102 may perform the functionality of an AP, e.g., a WiFi AP, an access node, a base station, a router, and the like; and/or wireless communication devices 132, 160, 170, and/or 180 may perform the functionality of non-AP stations.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In other embodiments, wireless communication devices 102, 132, 160, 170, and/or 180 may include, may operate as, and/or may perform the functionality of, any other device or station.

In some demonstrative embodiments, wireless communication devices 102, 132, 160, 170, and/or 180 may be capable of communicating content, data, information and/or signals via wireless medium 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, wireless communication devices 102, 132, 160, 170, and/or 180 may include one or more radios including circuitry and/or logic configured to perform wireless communication between devices 102, 132, 160, 170, 180, and/or one or more other wireless communication devices. For example, device 102 may include at least one radio 184, and/or device 132 may include at least one radio 194.

In some demonstrative embodiments, radios 184 and/or 194 may include one or more wireless receivers (Rx) including circuitry and/or logic configured to receive wireless communication signals, RF signals, frames, blocks, transmission streams, packets, messages, data items, and/or data. For example, radio 184 may include at least one receiver 106, and/or radio 194 may include at least one receiver 136.

In some demonstrative embodiments, radios 184 and/or 194 may include one or more wireless transmitters (Tx) including circuitry and/or logic configured to send wireless communication signals, RF signals, frames, blocks, transmission streams, packets, messages, data items, and/or data. For example, radio 184 may include at least one transmitter 104, and/or radio 194 may include at least one transmitter 134.

In some demonstrative embodiments, radios 184 and/or 194, transmitters 104 and/or 134, and/or receivers 106 and/or 136 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 184 and/or 194 may include, or may be associated with, one or more antennas 108 and/or 138, respectively.

In one example, device 102 may include a single antenna 108. In another example, device 102 may include two or more antennas 108.

In one example, device 132 may include a single antenna 138. In another example, device 132 may include two or more antennas 138.

Antennas 108 and/or 138 may include any type of antennas suitable to transmit and/or receive wireless communication signals, blocks, frames, transmission streams, packets, messages and/or data. For example, antennas 108 and/or 138 may include any suitable configuration, structure and/or arrangement of one or more antenna elements, components, units, assemblies and/or arrays. Antennas 108 and/or 138 may include, for example, antennas suitable for directional communication, e.g., using beamforming techniques. For example, antennas 108 and/or 138 may include a phased array antenna, a multiple element antenna, a set of switched beam antennas, and/or the like. In some embodiments, antennas 108 and/or 138 may implement transmit and receive functionalities using separate transmit and receive antenna elements. In some embodiments, antennas 108 and/or 138 may implement transmit and receive functionalities using common and/or integrated transmit/receive elements.

In some demonstrative embodiments, wireless communication device 102, 132, 160, 170, and/or 180 may include a controller configured to perform one or more communications, to generate and/or communicate one or more messages and/or transmissions, and/or to perform one or more functionalities, operations and/or procedures by and/or between devices 102, 132, 160, 170, and/or 180 and/or other devices, and/or any other functionality, e.g., as described below. For example, device 102 may include a controller 110, and/or device 132 may include a controller 140.

In some demonstrative embodiments, controllers 110 and/or 140 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 110 and/or 140. Additionally or alternatively, one or more functionalities of controllers 110 and/or 140 may be implemented by logic, which may be executed by a machine and/or one or more processors, e.g., as described below.

In one example, controller 110 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 140 may include circuitry and/or logic, for example, one or more processors including circuitry and/or logic, to cause, trigger and/or control a wireless device, e.g., device 132, and/or a wireless station, e.g., a wireless STA implemented by device 132, to perform one or more operations, communications and/or functionalities, e.g., as described herein.

In some demonstrative embodiments, device 102 may include a message processor 111 configured to generate, process and/or access one or messages communicated by device 102.

In one example, message processor 111 may be configured to generate one or more messages to be transmitted by device 102, and/or message processor 111 may be configured to access and/or to process one or more messages received by device 102, e.g., as described below.

In some demonstrative embodiments, device 132 may include a message processor 141 configured to generate, process and/or access one or messages communicated by device 132.

In one example, message processor 141 may be configured to generate one or more messages to be transmitted by device 132, and/or message processor 141 may be configured to access and/or to process one or more messages received by device 132, e.g., as described below.

In some demonstrative embodiments, message processors 111 and/or 141 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 111 and/or 141. Additionally or alternatively, one or more functionalities of message processors 111 and/or 141 may be implemented by logic, which may be executed by a machine and/or one or more processors, e.g., as described below.

In some demonstrative embodiments, at least part of the functionality of message processor 111 may be implemented as part of radio 184, and/or at least part of the functionality of message processor 141 may be implemented as part of radio 194.

In some demonstrative embodiments, at least part of the functionality of message processor 111 may be implemented as part of controller 110, and/or at least part of the functionality of message processor 141 may be implemented as part of controller 140.

In other embodiments, the functionality of message processor 111 may be implemented as part of any other element of device 102, and/or the functionality of message processor 141 may be implemented as part of any other element of device 132.

In some demonstrative embodiments, at least part of the functionality of controller 110 and/or message processor 111 may be implemented by an integrated circuit, for example, a chip, e.g., a System on Chip (SoC). In one example, the chip or SoC may be configured to perform one or more functionalities of radio 184. For example, the chip or SoC may include one or more elements of controller 110, one or more elements of message processor 111, and/or one or more elements of radio 184. In one example, controller 110, message processor 111, and radio 184 may be implemented as part of the chip or SoC.

In other embodiments, controller 110, message processor 111 and/or radio 184 may be implemented by one or more additional or alternative elements of device 102.

In some demonstrative embodiments, at least part of the functionality of controller 140 and/or message processor 141 may be implemented by an integrated circuit, for example, a chip, e.g., a System on Chip (SoC). In one example, the chip or SoC may be configured to perform one or more functionalities of radio 194. For example, the chip or SoC may include one or more elements of controller 140, one or more elements of message processor 141, and/or one or more elements of radio 194. In one example, controller 140, message processor 141, and radio 194 may be implemented as part of the chip or SoC.

In other embodiments, controller 140, message processor 141 and/or radio 194 may be implemented by one or more additional or alternative elements of device 132.

In some demonstrative embodiments, wireless communication device 102 may also include, for example, a processor 112, an input unit 118, an output unit 120, a memory unit 114, and/or a storage unit 116; and/or wireless communication devices 132, 160, 170, and/or 180 may also include, for example, a processor 142, an input unit 148, an output unit 150, a memory unit 144, and/or a storage unit 146. Wireless communication devices 102, 132, 160, 170, and/or 180 may optionally include other suitable hardware components and/or software components. In some demonstrative embodiments, some or all of the components of wireless communication devices 102, 132, 160, 170, and/or 180 may be enclosed in a common housing or packaging, and may be interconnected or operably associated using one or more wired or wireless links. In other embodiments, components of wireless communication devices 102, 132, 160, 170, and/or 180 may be distributed among multiple or separate devices.

In some demonstrative embodiments, processor 112 and/or processor 142 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 112 executes instructions, for example, of an Operating System (OS) of device 102 and/or of one or more suitable applications. Processor 142 executes instructions, for example, of an Operating System (OS) of device 132 and/or of one or more suitable applications.

In some demonstrative embodiments, input unit 118 and/or input unit 148 may include, for example, a keyboard, a keypad, a mouse, a touch-screen, a touch-pad, a track-ball, a stylus, a microphone, or other suitable pointing device or input device. Output unit 120 and/or output unit 150 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 114 and/or memory unit 144 may include, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 116 and/or storage unit 146 may include, for example, a hard disk drive, a floppy disk drive, a Compact Disk (CD) drive, a CD-ROM drive, a DVD drive, or other suitable removable or non-removable storage units. Memory unit 114 and/or storage unit 116, for example, may store data processed by device 102. Memory unit 144 and/or storage unit 146, for example, may store data processed by device 132.

In some demonstrative embodiments, devices 102, 132, 160, 170, and/or 180 may be configured to perform multicast communication, e.g., as described below.

Figure 2:
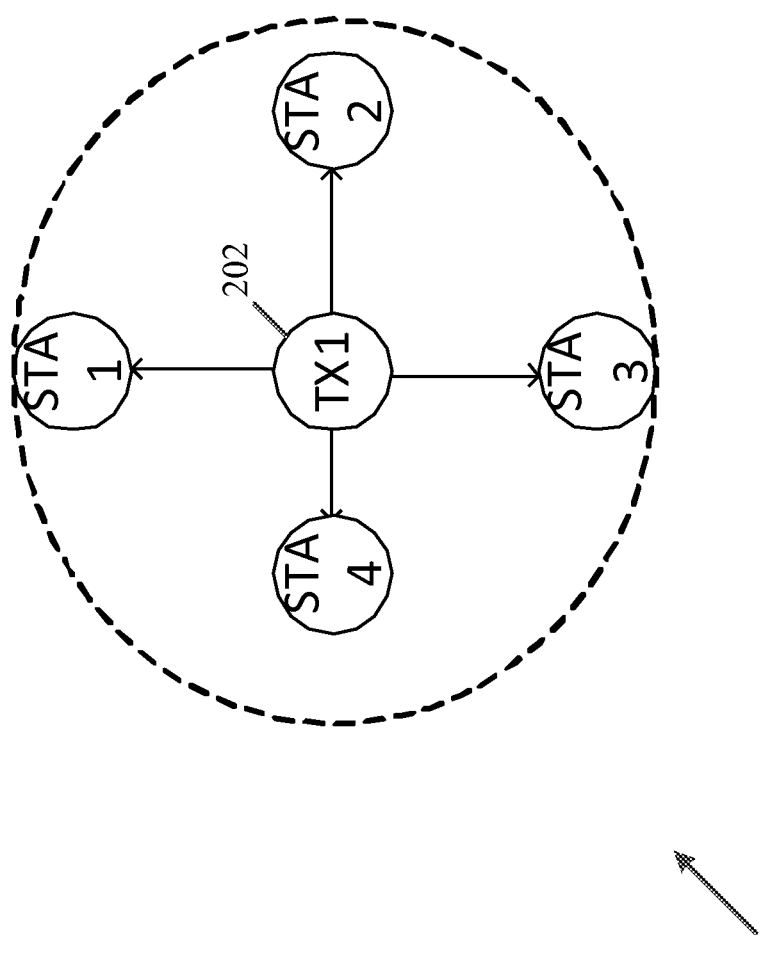
FIG. 2 is a schematic illustration of a multicast communication scheme, in accordance with some demonstrative embodiments.

Reference is to FIG. 2, which schematically illustrates a multicast communication scheme 200, in accordance with some demonstrative embodiments.

In some demonstrative embodiments, as shown in FIG. 2, a device 202 may operate as a multicast transmitter station, denoted TX1, to transmit a multicast transmission to a plurality of multicast receiver stations, denoted STA1, STA2, STA3, and STA4.

For example, device 102 (FIG. 1) may operate as, and/or perform the functionality of, multicast transmitter station 202, and/or devices 132, 160, 170, and/or 180 (FIG. 1) may operate as, and/or perform the functionality of, the plurality of multicast receiver stations, e.g., STA1, STA2, STA3, and/or STA4.

In some demonstrative embodiments, in order to achieve an increased efficiency using a multicast transmission, it may be required to ensure reliable multicast transmission. For example, it may be advantageous for multicast transmitter station 202 to know, which multicast receiver stations do not receive the transmission, e.g., so that any required retransmission can be performed.

In some demonstrative embodiments, a multicast communication scheme using redundant retransmission or high overhead, for example, for a sequential acknowledgement procedure, may sacrifice an efficiency of the multicast transmission, e.g., in order to provide reliable multicast transmission.

In some demonstrative embodiments, a Directed Multicast Service (DMS) mode may not be efficient in some scenarios and/or implementations. For example, the DMS mode may include sending packets, e.g., duplicating over-the-air directly to each receiver, and sending separate acknowledgement requests and random retransmissions of unacknowledged packets to each receiver.

In some demonstrative embodiments, a Groupcast with Retries (GCR) Block Acknowledgement (ACK) (BA) mode may not be efficient in some scenarios and/or implementations. For example, the GCR BA mode may include sending the packets as multicast transmissions to a plurality of devices, and harvesting reception status from one or more, e.g., all, devices of the plurality of devices through sequential Block Acknowledgement Request (BAR), and Block Acknowledgement Response. The GCR mode may include randomly retransmitting the unacknowledged packets, e.g., based upon Block Acknowledgement responses.

In some demonstrative embodiments, a GCR Unsolicited (GCR-U) retry mode may not be efficient in some scenarios and/or implementations. For example, the GCR-U mode may include sending a frame a pre-defined number of times to a plurality of devices, e.g., without the plurality of devices acknowledging any received transmission.

In some demonstrative embodiments, performing the multicast transmission relying on modes such as a separate unicast transmission, e.g., according to the DMS mode, a sequential BAR/BA sequence, e.g., according to the GCR-BA mode, and/or an unsolicited retry, e.g., according to the GCR-U mode, may decrease efficiency and/or increase an overhead.

Referring back to FIG. 1, in some demonstrative embodiments, devices 102, 132, 160, 170, and/or 180 may be configured to communicate a multicast transmission utilizing a multicast communication scheme, which may be configured, for example, to provide at least efficient communication, e.g., in terms of overhead of acknowledgements and/or retransmission, and/or for example, while achieving at least an increased and/or improved level of reliability, and/or to provide any additional or alternative improvements, benefits and/or advantages, e.g., as described below.

In some demonstrative embodiments, devices 102, 132, 160, 170, and/or 180 may be configured to utilize a Multi-User (MU) acknowledgement scheme, for example, a MU Block ACK or ACK ("MU Block ACK/ACK") scheme, for to communicate acknowledgements of the multicast transmission, e.g., as described below.

In some demonstrative embodiments, the MU Block ACK/ACK scheme may, for example, enable at least to reduce overhead, provide reliable multicast transmission, and/or any additional or alternative improvements, benefits and/or advantages.

In some demonstrative embodiments, devices 102, 132, 160, 170, and/or 180 may be configured to perform a MU communication, for example, including an OFDMA transmission, and/or a MU Block ACK/ACK for Uplink (UL) or a Downlink (DL) MU transmission, e.g., as described below.

In some demonstrative embodiments, devices 102, 132, 160, 170, and/or 180 may be configured to utilize the MU Block ACK/ACK scheme, for example, to provide a potential for a multicast transmitter station, e.g., device 102, to transmit at least one multicast transmission, which may be acknowledged by at least one MU Block ACK/ACK transmission, e.g., as described below.

For example, transmitting the multicast transmission may be followed by the MU Block ACK/ACK transmission, for example, to enable at least increased the efficiency and/or to reduce the overhead of the acknowledgement.

In some demonstrative embodiments, devices 102, 132, 160, 170, and/or 180 may be configured to process communication of the multicast transmission to two or more devices, e.g., based on the MU Block ACK/ACK scheme.

In some demonstrative embodiments, controller 110 may be configured to control, cause, and/or trigger transmitter 104 to process transmission of the multicast transmission to a plurality of devices, e.g., to devices 132, 160, 170, and/or 180.

In some demonstrative embodiments, controller 110 may be configured to control, cause, and/or trigger receiver 106 to process reception of at least one MU ACK transmission from two or more devices of the plurality of devices. The MU ACK transmission may be configured to acknowledge receipt of the multicast transmission by the two or more devices, e.g., as described below.

For example, controller 140 may be configured to control, cause, and/or trigger a multicast receiver station implemented by device 132 to process reception of the multicast frame from device 102, and to transmit an acknowledgement as part of MU ACK, e.g., over an OFDMA resource unit (RU) of the MU ACK frame, which may be allocated for the multicast receiver, e.g., as described below.

For example, receiver 106 may receive at least one MU ACK transmission from two or more devices of devices 132, 160, 170, and/or 180. The MU ACK transmission may acknowledge receipt of the multicast transmission by the two or more devices of devices 132, 160, 170, and/or 180.

In some demonstrative embodiments, the MU ACK transmission may include a MU normal ACK transmission, a MU Block ACK transmission, and/or any other type of acknowledgement transmission.

In some demonstrative embodiments, the MU acknowledgement may include a normal MU acknowledgement, e.g., as described below.

In some demonstrative embodiments, the MU acknowledgement may include a MU Block acknowledgement, e.g., as described below.

In some demonstrative embodiments, the MU Block ACK/ACK transmission may include an OFDMA transmission, e.g., as described below.

In some demonstrative embodiments, controller 110 may be configured to control, cause, and/or trigger receiver 106 to process reception of at least one MU ACK transmission, e.g., a single MU ACK transmission or a plurality of MU ACK transmissions, from all of the plurality of devices, for example, subsequent, e.g., immediately subsequent, to the multicast transmission, e.g., as described below with reference to FIG. 3.

For example, receiver 106 may receive the MU ACK transmission from all of the plurality of devices 132, 160, 170, and/or 180.

Reference is made to FIG. 3, which schematically illustrates a multicast communication sequence 300, in accordance with some demonstrative embodiments.

In some demonstrative embodiments, multicast communication sequence 300 may be configured to communicate a multicast transmission from a multicast transmitter station, e.g., multicast transmitter station 202 (FIG. 2), to a plurality of multicast receiver stations, for example, four multicast receiver stations, e.g., the stations STA1, STA2, STA3, and STA4.

In some demonstrative embodiments, the multicast transmitter station and the plurality of multicast receiver stations may be configured to utilize a MU Block ACK/ACK scheme, which may include, for example, performing a multicast communication according to a multicast communication procedure, method, process and/or protocol, e.g., as described below.

In some demonstrative embodiments, as shown in FIG. 3, the multicast transmitter station may transmit a multicast transmission 302 to STA1, STA2, STA3, and/or STA4.

For example, controller 110 (FIG. 1) may be configured to control, cause, and/or trigger the multicast transmitter station implemented by device 102 (FIG. 1), to process transmission of multicast transmission 302 to a plurality of multicast receiver stations, e.g., the plurality of multicast receiver stations implemented by devices 132, 160, 170, and/or 180 (FIG. 1). For example, controller 140 (FIG. 1) may be configured to control, cause, and/or trigger the multicast transmitter station implemented by device 132 (FIG. 1) to operate as one of STA1, ST2, ST3 or ST4 of FIG. 3.

In some demonstrative embodiments, as shown in FIG. 3, the multicast transmitter station may receive a MU ACK transmission, for example, a single MU ACK transmission 304 from all of the plurality of multicast receiver stations, e.g., STA1, STA2, STA3, and/or STA4, for example, to acknowledge receipt of multicast transmission 302.

For example, controller 140 (FIG. 1) may be configured to control, cause, and/or trigger a multicast receiver station implemented by device 132 (FIG. 1) to process reception of the multicast frame 302, and to transmit an acknowledgement as part of MU ACK 304, e.g., over an OFDMA resource unit (RU) of MU ACK frame 304, which may be allocated for the multicast receiver, e.g., as described below.

For example, controller 110 (FIG. 1) may be configured to control, cause, and/or trigger the multicast transmitter station to process reception of the single MU ACK transmission 304 from all of the plurality of multicast receiver stations, e.g., to acknowledge receipt of multicast transmission 302.

In some demonstrative embodiments, as shown in FIG. 3, the multicast transmitter station may receive a MU ACK transmission 304, for example, immediately subsequent to and/or in response to multicast transmission 302. For example, the MU ACK transmission 304 may be triggered by multicast transmission 302.

Referring back to FIG. 1, in some demonstrative embodiments, controller 110 may be configured to control, cause, and/or trigger receiver 106 to process reception of at least one MU ACK transmission from the plurality of devices 132, 160, 170, and/or 180, e.g., immediately subsequent to the multicast transmission.

For example, as shown in FIG. 3, receiver 106 may receive the MU ACK transmission 304 (FIG. 3) immediately subsequent to the multicast transmission 302 (FIG. 3), for example, if devices 102, 132, 160, 170, and/or 180 are synchronized.

In other demonstrative embodiments, controller 110 may be configured to control, cause, and/or trigger transmitter 104 to process transmission of at least one trigger frame to trigger at least one MU ACK transmission from devices 132, 160, 170, and/or 180.

For example, transmitter 104 may transmit the trigger frame to perform uplink synchronization between device 102 and devices 132, 160, 170, and/or 180, for example, to schedule and/or synchronize the transmission of the at least one MU ACK transmission.

In some demonstrative embodiments, a timing of the MU ACK transmission, e.g., from devices 132, 160, 170 and/or 180, may be based on an end timing point of the multicast transmission, or the trigger frame, for example, with an addition of a common interval, e.g., a Short Interframe Space (SIFS), or any other interval.

In some demonstrative embodiments, controller 110 may be configured to control, cause, and/or trigger transmitter 104 to process transmission of a first trigger frame to trigger a first MU ACK transmission from a first group of two or more devices of the plurality of devices 132, 160, 170, and/or 180, e.g., devices 132 and 160.

In some demonstrative embodiments, controller 110 may be configured to control, cause, and/or trigger transmitter 104 to process transmission of a second trigger frame, e.g., different from the first trigger frame, to trigger a second MU ACK transmission from a second group of two or more devices of the plurality of devices 132, 160, 170, and/or 180, e.g., devices 170 and 180.

In some demonstrative embodiments, controller 110 may be configured to control, cause, and/or trigger receiver 106 to process reception of at least the first and the second MU ACK transmissions, e.g., to acknowledge the multicast transmission.

In some demonstrative embodiments, controller 110 may be configured to control, cause, and/or trigger receiver 106 to process reception of the first MU ACK from the first group of two or more devices of the plurality of devices 132, 160, 170, and/or 180, e.g., subsequent to the first trigger frame.

In some demonstrative embodiments, controller 110 may be configured to control, cause, and/or trigger receiver 106 to process reception of the second MU ACK from the second group of two or more devices of the plurality of devices 132, 160, 170, and/or 180, e.g., subsequent to the second trigger frame.

For example, transmitter 104 may transmit the first trigger frame to trigger the first MU ACK transmission from the first group of two or more devices, e.g., devices 132 and 160, and to transmit the second trigger frame to trigger the second MU ACK transmission from the second group of two or more devices, e.g., devices 170 and 180, e.g., as described below with respect to FIG. 4.

For example, controller 140 may be configured to control, cause, and/or trigger a multicast receiver station implemented by device 132 to process reception of the first trigger frame or the second trigger frame, and to transmit an acknowledgement as part of a MU ACK, e.g., over an OFDMA resource unit (RU) of the MU ACK, which may be allocated for the multicast receiver, e.g., as described below with reference to FIG. 4.

Reference is made to FIG. 4, which schematically illustrates a multicast communication sequence 400, in accordance with some demonstrative embodiments.

In some demonstrative embodiments, multicast communication sequence 400 may be configured to communicate a multicast transmission from a multicast transmitter station, e.g., multicast transmitter station 202 (FIG. 2), to a plurality of multicast receiver stations, for example, four multicast receiver stations, e.g., the stations STA1, STA2, STA3, and STA4.

In some demonstrative embodiments, the multicast transmitter station and the plurality of multicast receiver stations may be configured to utilize multicast communication sequence 400, which may include, for example, performing a multicast communication according to a multicast communication procedure, method, process and/or protocol, e.g., as described below.

In some demonstrative embodiments, as shown in FIG. 4, the multicast transmitter station and the plurality of multicast receiver stations may be configured to utilize a MU Block ACK/ACK scheme, which may include, for example, performing a multicast communication including the communication of a multicast transmission followed by one or more, e.g., multiple, trigger frames, and one or more, e.g., multiple, MU ACK transmissions, e.g., as described below.

In some demonstrative embodiments, as shown in FIG. 4, the multicast transmitter station may transmit a multicast transmission 402 to STA1, STA2, STA3, and/or STA4.

For example, controller 110 (FIG. 1) may be configured to control, cause, and/or trigger the multicast transmitter station implemented by device 102 (FIG. 1), to process transmission of a multicast transmission 402 to the plurality of multicast receiver stations, e.g., the plurality of multicast receiver stations implemented by devices 132, 160, 170, and/or 180 (FIG. 1). For example, controller 140 (FIG. 1) may be configured to control, cause, and/or trigger the multicast transmitter station implemented by device 132 (FIG. 1) to operate as one of STA1, ST2, ST3 or ST4 of FIG. 4.

In some demonstrative embodiments, as shown in FIG. 4, the multicast transmitter station may transmit a trigger frame 404 to STA1 and STA2, e.g., to trigger a MU ACK transmission 406 from STA1 and STA2, e.g., subsequent to multicast transmission 402.

For example, controller 110 (FIG. 1) may be configured to control, cause, and/or trigger the multicast transmitter station to process transmission of a first trigger frame, e.g., trigger frame 404, to a first group of two or more multicast receiver stations of the plurality of multicast receiver stations, e.g., STA1 and STA2, to trigger MU ACK transmission 406 from STA1 and STA2, e.g., subsequent to multicast transmission 402.

In some demonstrative embodiments, as shown in FIG. 4, the multicast transmitter station may receive MU ACK transmission 406 from STA1 and STA2, e.g., to acknowledge the receipt of multicast transmission 402.

For example, controller 110 (FIG. 1) may be configured to control, cause, and/or trigger the multicast transmitter station to process reception of a first MU ACK transmission, e.g., MU ACK transmission 406, from the first group of two or more multicast receiver stations of the plurality of multicast receiver stations, e.g., STA1 and STA2, to acknowledge the receipt of multicast transmission 402.

In some demonstrative embodiments, as shown in FIG. 4, the multicast transmitter station may transmit a trigger frame 408 to STA3 and STA4, e.g., subsequent to the reception of MU ACK transmission 406.

For example, controller 110 (FIG. 1) may be configured to control, cause, and/or trigger the multicast transmitter station to process transmission of a second trigger frame, e.g., trigger frame 408, to a second group of two or more multicast receiver stations of the plurality of multicast receiver stations, e.g., STA3 and STA4, to trigger a MU ACK transmission 410 from STA3 and STA4, e.g., to acknowledge the receipt of multicast transmission 402.

In some demonstrative embodiments, as shown in FIG. 4, the multicast transmitter station may receive MU ACK transmission 410 from STA3 and STA4, e.g., to acknowledge the receipt of multicast transmission 402.

For example, controller 110 (FIG. 1) may be configured to control, cause, and/or trigger the multicast transmitter station to process reception of a second MU ACK transmission, e.g., MU ACK transmission 410, from the second group of two or more multicast receiver stations of the plurality of multicast receiver stations, e.g., STA3 and STA4, for example, to acknowledge the receipt of multicast transmission 402.

Referring back to FIG. 1, in some demonstrative embodiments, controller 110 may be configured to control, cause, and/or trigger transmitter 104 to process transmission of one multicast transmission to the plurality of devices, e.g., as described above.

In other demonstrative embodiments, controller 110 may be configured to control, cause, and/or trigger transmitter 104 to process transmission of two or more multicast transmissions to the plurality of devices, e.g., as described below.

For example, transmitter 104 may transmit two or more multicast transmissions to the plurality of devices 132, 160, 170, and/or 180, e.g., prior to transmitting the trigger frame, and/or receiving the MU ACK transmission.

For example, controller 140 may be configured to control, cause, and/or trigger a multicast receiver station implemented by device 132 to process reception of two or more multicast transmissions from device 102, e.g., prior to receiving the trigger frame, and/or prior to transmitting the ACK as part of the MU ACK transmission, for example, as described below with reference to FIG. 5.

In some demonstrative embodiments, controller 110 may be configured to control, cause, and/or trigger transmitter 104 to process transmission of a first trigger frame to trigger a first MU Block ACK transmission from a first group of two or more devices of the plurality of devices 132, 160, 170, and/or 180, e.g., devices 132 and 160, for example, subsequent to, e.g., immediately subsequent to, the two or more multicast transmissions.

In some demonstrative embodiments, controller 110 may be configured to control, cause, and/or trigger receiver 106 to process reception of the first MU Block ACK transmission from the first group of two or more devices of the plurality of devices 132, 160, 170, and/or 180, e.g., subsequent to the first trigger frame.

In some demonstrative embodiments, controller 110 may be configured to control, cause, and/or trigger transmitter 104 to process transmission of a second trigger frame, different from the first trigger frame, to trigger a second MU Block ACK transmission from a second group of two or more devices of the plurality of devices 132, 160, 170, and/or 180, e.g., devices 170 and 180.

In some demonstrative embodiments, controller 110 may be configured to control, cause, and/or trigger receiver 106 to process reception of a second MU Block ACK transmission from the second group of two or more devices of the plurality of devices 132, 160, 170, and/or 180, e.g., subsequent to the second trigger frame, for example, to acknowledge receipt of the multicast transmissions.

For example, transmitter 104 may transmit the first trigger frame to trigger the first MU Block ACK transmission from the first group of two or more devices, e.g., devices 132 and 160, and to transmit the second trigger frame to trigger the second MU Block ACK transmission from the group of two or more devices, e.g., devices 170 and 180, e.g., as described below with respect to FIG. 5.

Figure 5:
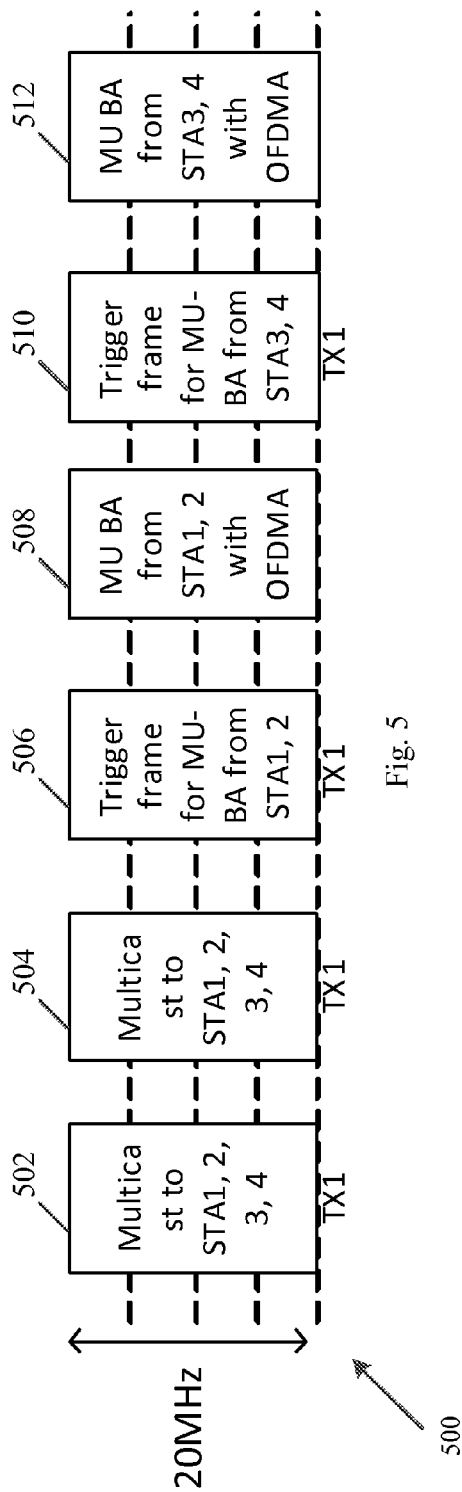
FIG. 5 is a schematic illustration of a multicast communication sequence, in accordance with some demonstrative embodiments.

Reference is made to FIG. 5, which schematically illustrates a multicast communication sequence 500, in accordance with some demonstrative embodiments.

In some demonstrative embodiments, multicast communication sequence 500 may be configured to communicate two or more multicast transmissions from a multicast transmitter station, e.g., multicast transmitter station 202 (FIG. 2), to a plurality of multicast receiver stations, for example, four multicast receiver stations, e.g., the stations STA1, STA2, STA3, and STA4.

In some demonstrative embodiments, the multicast transmitter station, and the plurality of multicast receiver stations may be configured to utilize multicast communication sequence 500, which may include, for example, performing a multicast communication according to a multicast communication procedure, method, process and/or protocol, e.g., as described below.

In some demonstrative embodiments, as shown in FIG. 5, the multicast transmitter station, and the plurality of receiver stations may be configured to utilize a MU Block ACK scheme, which may include, for example, performing multicast communication including the communication of multiple multicast transmissions, which may be followed by one or more, e.g., multiple, trigger frames, and one or more, e.g., multiple, MU Block ACK transmissions, e.g., as described below.

In some demonstrative embodiments, as shown in FIG. 5, the multicast transmitter station may transmit two multicast transmissions 502 and 504 to STA1, STA2, STA3, and/or STA4, e.g., sequentially.

For example, controller 110 (FIG. 1) may be configured to control, cause, and/or trigger the multicast transmitter station implemented by device 102 (FIG. 1), to process transmission of two or more multicast transmissions, e.g., including multicast transmissions 502 and 504, to the plurality of multicast receiver stations, e.g., the plurality of multicast receiver stations implemented by devices 132, 160, 170, and/or 180 (FIG. 1). For example, controller 140 (FIG. 1) may be configured to control, cause, and/or trigger the multicast transmitter station implemented by device 132 (FIG. 1) to operate as one of STA1, ST2, ST3 or ST4 of FIG. 5.

In some demonstrative embodiments, as shown in FIG. 5, the multicast transmitter station may transmit a trigger frame 506 to STA1 and STA2, e.g., to trigger a MU Block ACK transmission from STA1 and STA2.

For example, controller 110 (FIG. 1) may be configured to control, cause, and/or trigger the multicast transmitter station to process transmission of a first trigger frame, e.g., trigger frame 506, to a first group of two or more multicast receiver stations of the plurality of the receiver stations, e.g., STA1 and STA2, to trigger a MU Block ACK transmission 508 from STA1 and STA2, e.g., subsequent to multicast transmissions 502 and/or 504.

In some demonstrative embodiments, as shown in FIG. 5, the multicast transmitter station may receive MU Block ACK transmission 508 from STA1 and STA2, e.g., to acknowledge the receipt of multicast transmissions 502 and/or 504.

For example, controller 110 (FIG. 1) may be configured to control, cause, and/or trigger the multicast transmitter station to process reception of a first MU ACK transmission, e.g., MU Block ACK transmission 508, from the first group of two or more multicast receiver stations of the plurality of multicast receiver stations, e.g., STA1 and STA2, e.g., to acknowledge a receipt of multicast transmissions 502 and/or 504.

In some demonstrative embodiments, as shown in FIG. 5, the multicast transmitter station may transmit a trigger frame 510 to STA3 and STA4 to trigger a MU Block ACK transmission 512 from STA3 and STA4, e.g., to acknowledge the receipt of multicast transmissions 502 and/or 504.

For example, controller 110 (FIG. 1) may be configured to control, cause, and/or trigger the multicast transmitter station to process transmission of a second trigger frame, e.g., trigger frame 510, to a second group of two or more multicast receiver stations of the plurality of multicast receiver stations, e.g., STA3 and STA4, to trigger a MU Block ACK transmission 512 from STA3 and STA4, e.g., to acknowledge the receipt of multicast transmissions 502 and/or 504.

In some demonstrative embodiments, as shown in FIG. 5, the multicast transmitter station may receive MU Block ACK transmission 512 from STA3 and STA4, e.g., to acknowledge the receipt of multicast transmissions 502 and/or 504.

For example, controller 110 (FIG. 1) may be configured to control, cause, and/or trigger the multicast transmitter station to process reception of a second MU Block ACK transmission, e.g., MU Block ACK transmission 512, from the second group of two or more multicast receiver stations of the plurality of multicast receiver stations, e.g., STA3 and STA4, for example, to acknowledge the receipt of multicast transmissions 502 and 504.

Referring back to FIG. 1, in some demonstrative embodiments, controller 110 may be configured to control, cause, and/or trigger receiver 106 to process reception of a MU ACK transmission from the plurality of devices 132, 160, 170, and/or 180 subsequent to the multicast transmission, for example, even without transmitting a trigger frame, e.g., as described above with reference to FIG. 3.

In some demonstrative embodiments, controller 110 may be configured to control, cause, and/or trigger receiver 106 to process reception of a MU ACK transmission from the plurality of devices 132, 160, 170, and/or 180 subsequent to a trigger frame, e.g., as described above with reference to FIGS. 4 and/or 5.

In some demonstrative embodiments, controller 110 may be configured to control, cause, and/or trigger radio 184 to process reception of a first MU ACK transmission from a first group of two or more devices of the plurality of devices 132, 160, 170, and/or 180 subsequent to the multicast transmission, e.g., without using a trigger frame; and process transmission of a trigger frame to trigger a second MU ACK transmission from a second group of two or more devices of the plurality of devices 132, 160, 170, and/or 180, e.g., subsequent to the first MU ACK transmission, e.g., as described below.

For example, receiver 106 may receive the first MU ACK transmission from the group of two or more devices, e.g., devices 132 and 160, subsequent to the multicast transmission, and transmitter 104 may transmit the trigger frame to trigger the second MU ACK transmission from the group of two or more devices, e.g., devices 170 and 180, e.g., as described below with respect to FIG. 6.

Figure 6:
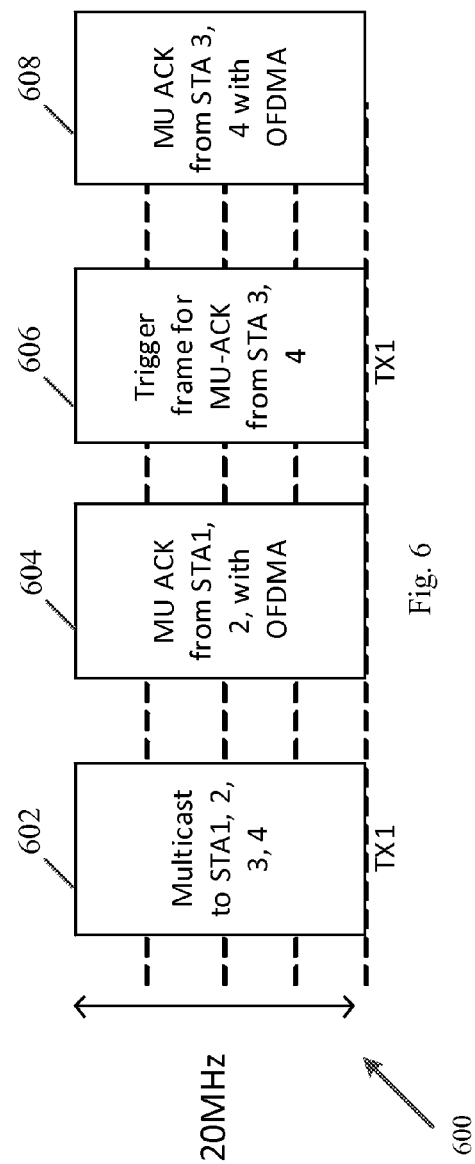
FIG. 6 is a schematic illustration of a multicast communication sequence, in accordance with some demonstrative embodiments.

Reference is made to FIG. 6, which schematically illustrates a multicast communication sequence 600, in accordance with some demonstrative embodiments.

In some demonstrative embodiments, multicast communication sequence 600 may be configured to communicate a multicast transmission from a multicast transmitter station, e.g., multicast transmitter station 202 (FIG. 2), to a plurality of multicast receiver stations, for example, four multicast receiver stations, e.g., the stations STA1, STA2, STA3, and STA4.

In some demonstrative embodiments, as shown in FIG. 6, the multicast transmitter station and the plurality of multicast receiver stations may be configured to utilize multicast communication sequence 600, which may include, for example, performing a multicast communication according to a multicast communication procedure, method, process and/or protocol, e.g., as described below.

In some demonstrative embodiments, as shown in FIG. 6, the multicast transmitter station and the plurality of multicast receiver stations may be configured to utilize a MU Block ACK/ACK scheme, which may include, for example, performing multicast communication including the communication of a multicast transmission, which may be followed by a MU ACK transmission, and one or more, e.g., multiple, trigger frames, to trigger one or more other MU ACK transmissions, e.g., as described below.

In some demonstrative embodiments, as shown in FIG. 6, the multicast transmitter station may transmit a multicast transmission 602 to STA1, STA2, STA3, and/or STA4.

For example, controller 110 (FIG. 1) may be configured to control, cause, and/or trigger the multicast transmitter station implemented by device 102 (FIG. 1), to process transmission of a multicast transmission 602 to the plurality of multicast receiver stations, e.g., the plurality of multicast receiver stations implemented by devices 132, 160, 170, and/or 180 (FIG. 1). For example, controller 140 (FIG. 1) may be configured to control, cause, and/or trigger the multicast transmitter station implemented by device 132 (FIG. 1) to operate as one of STA1, ST2, ST3 or ST4 of FIG. 6.

In some demonstrative embodiments, as shown in FIG. 6, the multicast transmitter station may receive a MU ACK transmission 604 from STA1 and STA2, for example, immediately subsequent to multicast transmission 602, e.g., without transmitting a trigger frame.

For example, controller 110 (FIG. 1) may be configured to control, cause, and/or trigger the multicast transmitter station to process reception of a first MU ACK transmission, e.g., MU ACK transmission 604, from a first group of two or more multicast receiver stations of the plurality of multicast receiver stations, e.g., STAT and STA2, to acknowledge the receipt of multicast transmission 602, for example, subsequent to multicast transmission 602.

In some demonstrative embodiments, as shown in FIG. 6, the multicast transmitter station may transmit a trigger frame 606 to STA3 and STA4 to trigger a MU ACK transmission 608.

For example, controller 110 (FIG. 1) may be configured to control, cause, and/or trigger the multicast transmitter station to process transmission of trigger frame 606 to a second group of two or more multicast receiver stations of the plurality of multicast receiver stations, e.g., STA3 and STA4, to trigger a second MU ACK transmission, e.g., MU ACK transmission 608, from the STA3 and STA4.

In some demonstrative embodiments, as shown in FIG. 6, the multicast transmitter station may receive MU ACK transmission 608 from STA3 and STA4, e.g., to acknowledge the receipt of multicast transmission 602.

For example, controller 110 (FIG. 1) may be configured to control, cause, and/or trigger the multicast transmitter station to process reception of the second MU ACK transmission 608 from the second group of two or more multicast receiver stations of the plurality of multicast receiver stations, e.g., STA3 and STA4, for example, to acknowledge the receipt of multicast transmission 602.

Referring back to FIG. 1, in some demonstrative embodiments, controller 110 may be configured to control, cause, and/or trigger transmitter 104 to process transmission of one or more multicast frames and/or one or more trigger frames as separate transmissions, as individual transmissions, as independent transmissions, and/or spaced-apart transmissions, e.g., as described above.

In some demonstrative embodiments, controller 110 may be configured to control, cause, and/or trigger transmitter 104 to process transmission of a multicast transmission including one or more multicast frames followed by at least one trigger frame, e.g., as described below. For example, controller 1440 may be configured to control, cause, and/or trigger receiver 136 to process reception of a multicast transmission including one or more multicast frames followed by at least one trigger frame, e.g., as described below.

In some demonstrative embodiments, controller 110 may be configured to control, cause, and/or trigger transmitter 104 to process transmission of one or more multicast frames and one or more trigger frames as a sequence of data units of an aggregated transmission, e.g., as described below.

In some demonstrative embodiments, the aggregated transmission may include a sequence of Aggregated MAC Protocol Data Units (A-MPDUs), e.g., as described below with respect to FIG. 7.

In other demonstrative embodiments, the aggregated transmission may include any other type of aggregated data units.

Figure 7:
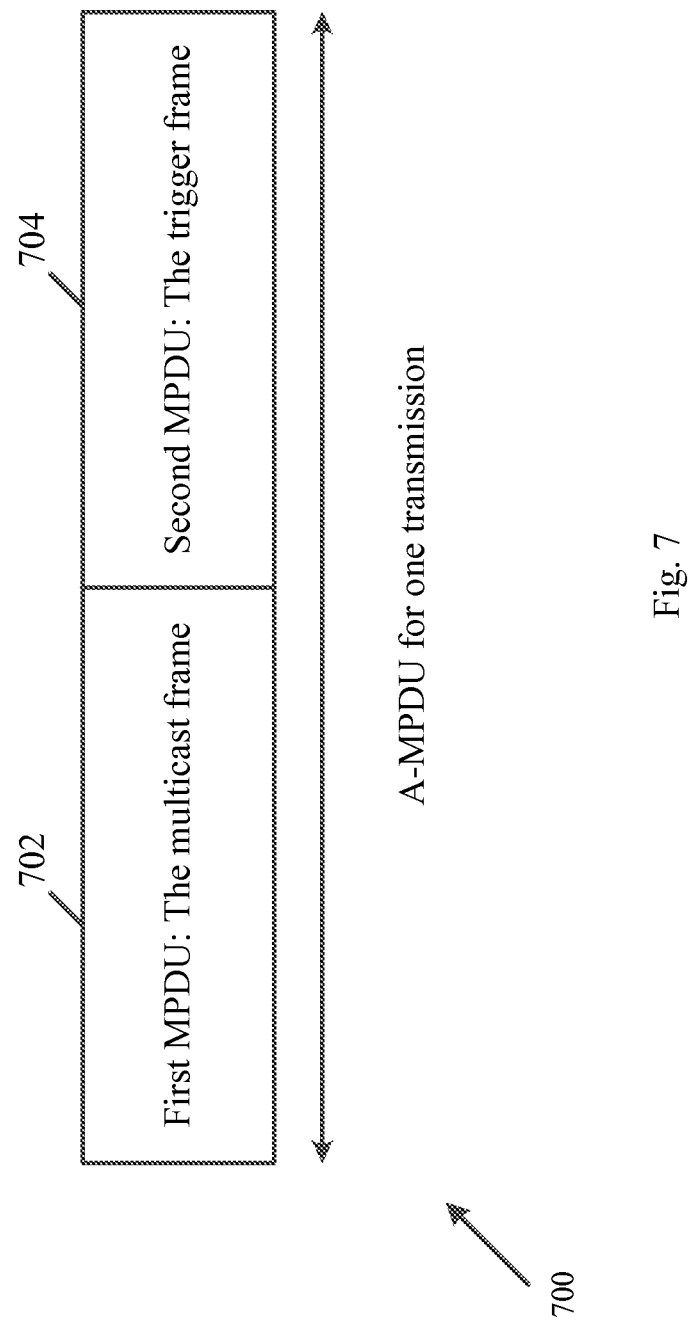
FIG. 7 is a schematic illustration of an Aggregated Media Access Control (MAC) Protocol Data Unit (A-MPDU) including a multicast MPDU and a trigger MPDU, in accordance with some demonstrative embodiments.

Reference is made to FIG. 7, which schematically illustrates an Aggregated MAC Service Data Unit (A-MPDU) transmission 700 including a multicast Protocol Data Unit (PDU) and a trigger PDU, in accordance with some demonstrative embodiments.

In some demonstrative embodiments, communicating the multicast transmission and the trigger as part of A-MPDU transmission 700 may increase throughput and decrease an overhead of a system, e.g., system 100 (FIG. 1).

In some demonstrative embodiments, controller 110 (FIG. 1) may be configured to control, cause, and/or trigger a multicast transmitter station implemented by device 102 (FIG. 1), to process transmission of A-MPDU transmission 700 to a plurality of multicast receiver stations, e.g., the plurality of multicast receiver stations implemented by devices 132, 160, 170, and/or 180 (FIG. 1), e.g., in accordance with multicast communication sequences 400 (FIG. 4), 500 (FIG. 5), and/or 600 (FIG. 6). In some demonstrative embodiments, controller 140 (FIG. 1) may be configured to control, cause, and/or trigger a multicast receiver station implemented by device 132 (FIG. 1), to process reception of A-MPDU transmission 700, for example, from device 102 (FIG. 1), e.g., in accordance with multicast communication sequences 400 (FIG. 4), 500 (FIG. 5), and/or 600 (FIG. 6)

In some demonstrative embodiments, as shown in FIG. 7, A-MPDU transmission 700 may include at least one first MPDU, e.g., MPDU 702, followed by a second MPDU, e.g., MPDU 704.

In some demonstrative embodiments, as shown in FIG. 7, MPDU 702 may include the multicast frame, and MPDU 704 may include the trigger frame.

In some demonstrative embodiments, controller 110 (FIG. 1) may be configured to control, cause, and/or trigger the multicast transmitter station to process transmission of A-MPDU transmission 700 to the plurality of multicast receiver stations, e.g., to transmit one or more multicast frames and to trigger a MU Block ACK/ACK transmission as part of an aggregated transmission.

Referring back to FIG. 1, in some demonstrative embodiments, controller 110 may be configured to address to the plurality of devices 132, 160, 170, and/or 180 individually, for example, according to an individual addressing scheme, e.g., as described below.

In some demonstrative embodiments, controller 110 may be configured to address to a group of two or more devices of the plurality of devices 132, 160, 170, and/or 180, for example, according to a group addressing scheme, e.g., as described below.

In some demonstrative embodiments, controller 110 may be configured to have the flexibility to select a type of the addressing scheme, e.g., as described below.

In one example, controller 110 may select the type of addressing scheme for addressing the multicast transmission and/or for triggering the MU Block ACK/ACK transmission, e.g., based on a number of intended multicast receiver stations to receive the multicast transmission, e.g., devices 132, 160, 170, and/or 180.

In another example, controller 110 may have the flexibility to choose the type of addressing scheme for addressing the multicast transmission and/or for triggering the MU Block ACK/ACK transmission based on any other additional or alternative criterion.

In some demonstrative embodiments, controller 110 may be configured to select to use an individual addressing scheme for addressing the multicast transmission and/or for triggering the MU Block ACK/ACK transmission, e.g., as described below.

In some demonstrative embodiments, the individual addressing scheme may be advantageous, for example, at least as no specific multicast group formation may be required.

For example, according to the individual addressing scheme, controller 110 may be able to control the multicast transmission, for example, using knowledge about the existence of a plurality of multicast receiver stations, e.g., devices 132, 160, 170, and/or 180.

In some demonstrative embodiments, the individual addressing scheme may be useful, for example, if addressed having a reduced size are used to identify the multicast receiver stations, for example, if hashed addresses, e.g., having a size, which is much less than 48 bits, are used.

In some demonstrative embodiments, the individual addressing scheme may be useful, for example, if the number of multicast receiver stations of a multicast transmission, e.g., devices 132, 160, 170, and/or 180, is relatively small.

In some demonstrative embodiments, according to the individual addressing scheme, controller 110 may be configured to control, cause, and/or trigger transmitter 104 to individually address devices 132, 160, 170, and/or 180, e.g., as described below.

In some demonstrative embodiments, controller 110 may be configured to control, cause, and/or trigger transmitter 104 to process transmission of a transmission, e.g., a multicast transmission and/or a trigger frame, including two or more addresses of respective ones of the two or more devices of the plurality of devices 132, 160, 170, and/or 180.

In some demonstrative embodiments, controller 110 may be configured to control, cause, and/or trigger transmitter 104 to process transmission of the two or more addresses as part of the multicast transmission.

In other embodiments, controller 110 may be configured to control, cause, and/or trigger transmitter 104 to process transmission of the two or more addresses as part of the trigger frame subsequent to the multicast transmission.

In some demonstrative embodiments, an order of the addresses in the multicast transmission and/or the trigger frame may include an order at which the multicast receiver stations are to respond to the multicast transmission and/or the trigger frame.

For example, controller 110 may be configured to control, cause, and/or trigger receiver 106 to process reception of the MU ACK transmission including two or more acknowledgements over two or more respective sub-channels, the two or more sub-channels being based on an order of the two or more addresses.

For example, controller 110 may individually address all of the plurality of devices 132, 160, 170, and/or 180 in an order, which may indicate the two or more sub-channels assigned for transmission of the two or more acknowledgements, e.g., as described below with respect to FIG. 8.

In other demonstrative embodiments, controller 110 may be configured to control, cause, and/or trigger transmitter 104 to process transmission of a specific sub-channel signaling for each device of the plurality of devices 132, 160, 170, and/or 180, for example, to enable each device of the plurality of devices 132, 160, 170, and/or 180 to determine a sub-channel assigned for each device.

For example, controller 132 may be configured to control, cause, and/or trigger transmitter 134 to process transmission of the MU ACK transmission over a sub-channel, e.g., an OFDM RU, being based on a relative position of an address of the multicast receiver station implemented by device 132 in the two or more addresses, e.g., as described below with reference to FIG. 8.

Figure 8:
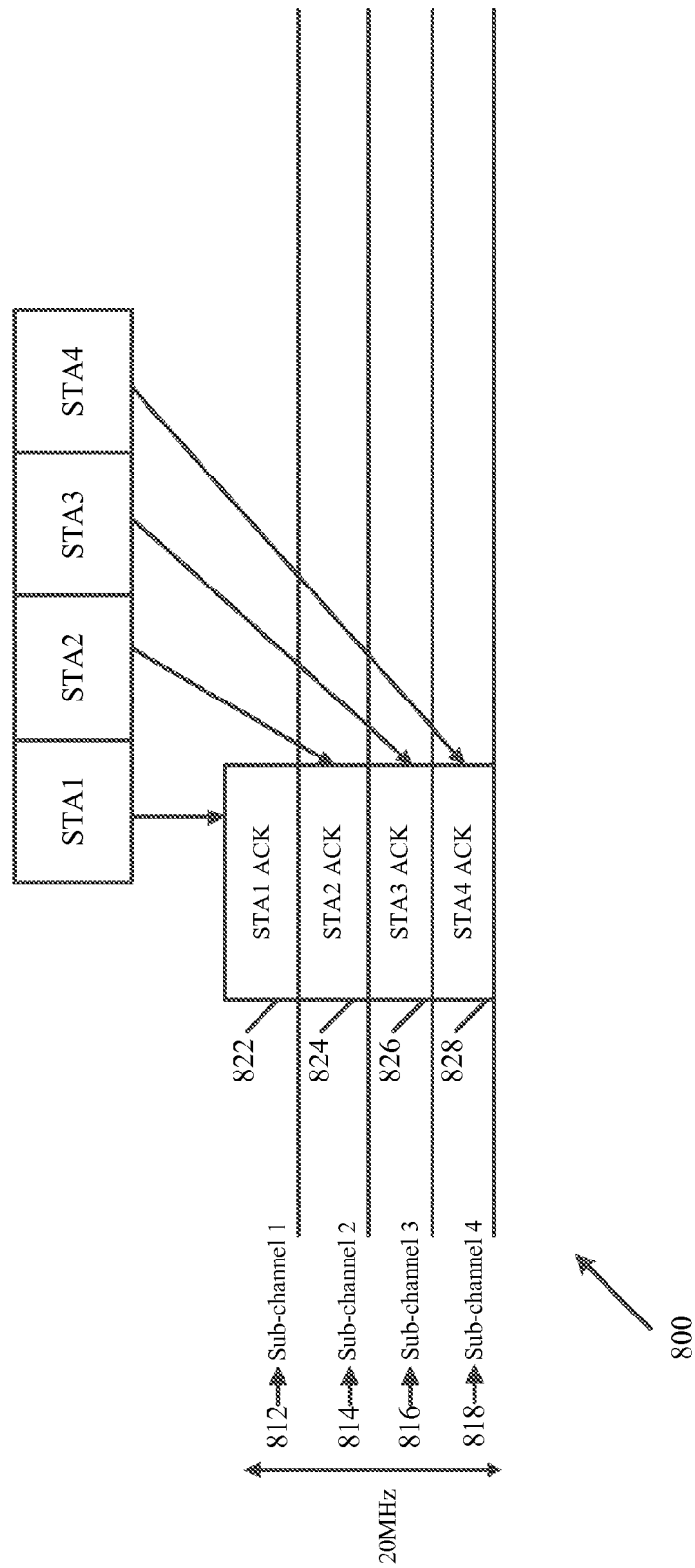
FIG. 8 is a schematic illustration of an individual addressing scheme, in accordance with some demonstrative embodiments.

Reference is to FIG. 8, which schematically illustrates an individual addressing scheme 800, in accordance with some demonstrative embodiments.

In some demonstrative embodiments, individual addressing scheme 800 may be configured to communicate a message, e.g., a multicast transmission and/or a trigger message, including two or more addresses, from a multicast transmitter station, e.g., multicast transmitter station 202 (FIG. 2), to a plurality of multicast receiver stations, for example, four multicast receiver stations, e.g., the stations STAT, STA2, STA3, and STA4. The two or more addresses may include addresses of respective ones of two or more multicast receiver stations of the plurality of multicast receiver stations.

In some demonstrative embodiments, controller 110 (FIG. 1) may be configured to control, cause, and/or trigger the multicast transmitter station implemented by device 102 (FIG. 1), to process transmission of a message, e.g., a multicast transmission and/or a trigger message, including two or more addresses, to the plurality of multicast receiver stations, e.g., the plurality of multicast receiver stations implemented by devices 132, 160, 170, and/or 180 (FIG. 1). The two or more addresses may be configured to implicitly assign assigned sub-channels, e.g., OFDMA RUs, for a MU ACK transmission from the plurality of multicast receiver stations.

In some demonstrative embodiments, as shown in FIG. 8, the plurality of multicast receiver stations may be configured to process transmission of the MU ACK transmission including two or more acknowledgements over two or more respective sub-channels, for example, based on an order of two or more addresses. For example, controller 140 (FIG. 1) may be configured to control, cause, and/or trigger the multicast transmitter station implemented by device 132 (FIG. 1) to operate as one of STA1, ST2, ST3 or ST4 of FIG. 8.

In some demonstrative embodiments, as shown in FIG. 8, STA1 may transmit an acknowledgement 822 over a sub-channel 812, for example, if sub-channel 812 is assigned to STA1 according to the order of addresses in the message received from the multicast transmitter station.

In some demonstrative embodiments, as shown in FIG. 8, STA2 may transmit an acknowledgement 824 over a sub-channel 814, for example, if sub-channel 814 is assigned to STA2 according to the order of addresses in the message received from the multicast transmitter station.

In some demonstrative embodiments, as shown in FIG. 8, STA3 may transmit an acknowledgement 826 over a sub-channel 816, for example, if sub-channel 816 is assigned to STA3 according to the order of addresses in the message received from the multicast transmitter station.

In some demonstrative embodiments, as shown in FIG. 8, STA4 may transmit an acknowledgement 828 over a sub-channel 818, for example, if sub-channel 818 is assigned to STA4 according to the order of addresses in the message received from the multicast transmitter station.

Referring back to FIG. 1, in some demonstrative embodiments, a number of the multicast receiver stations may exceed a number of available sub-channels allocated for the MU ACK. Accordingly, only some of the multicast receiver stations may be able to perform a transmission as part of a MU ACK.

In some demonstrative embodiments, a message, e.g., a multicast transmission or a trigger message, may include only addresses of a first plurality of multicast receiver stations, which may be assigned to the sub-channels of the MU ACK frame, while a second plurality of multicast receiver stations may not be addressed by the message.

In some demonstrative embodiments, one or more devices of the second plurality of devices, e.g., one or more of devices 132, 160, 170, and/or 180, may be configured to select not to respond with an acknowledgement.

In some demonstrative embodiments, one or more devices of the second plurality of devices, e.g., one or more of devices 132, 160, 170, and/or 180, may be configured to wait for a trigger frame to trigger an additional acknowledgement, e.g., as described above with reference to FIG. 6.

In some demonstrative embodiments, devices 102, 132, 160, 170, and/or 180 may be configured to support a Retransmission according to the individual addressing scheme, e.g., as described below.

In some demonstrative embodiments, controller 110 may be configured to control, cause, and/or trigger transmitter 104 to process retransmission of the multicast transmission to one or more devices of the plurality of devices 132, 160, 170, and/or 180, for example, after decoding the MU Block ACK/ACK transmission from the plurality of devices 132, 160, 170, and/or 180.

In some demonstrative embodiments, controller 110 may be configured to control, cause, and/or trigger transmitter 104 to process retransmission of the multicast transmission, for example, only to one or more devices of the plurality of devices 132, 160, 170, and/or 180, from which the MU Block ACK/ACK transmission is not received.

In some demonstrative embodiments, controller 110 may be configured to use a group addressing scheme to address the plurality of multicast receiver stations, e.g., as described below.

In some demonstrative embodiments, controller 110 may be configured to control, cause, and/or trigger transmitter 104 to process transmission of a message, e.g., the multicast transmission or the trigger frame, including a group address, to trigger the MU ACK transmission from a group of two or more devices of the plurality of devices 132, 160, 170, and/or 180.

For example, the group address may be configured to indicate a group of two or more multicast receiver devices, e.g., including two or more of devices 132, 160, 170, and/or 180. The group address may be configured, for example, to indicate an order, e.g., of sub-channels, in which devices of the group are to transmit the MU ACK transmission, e.g., as described below with respect to FIG. 9.

Figure 9:
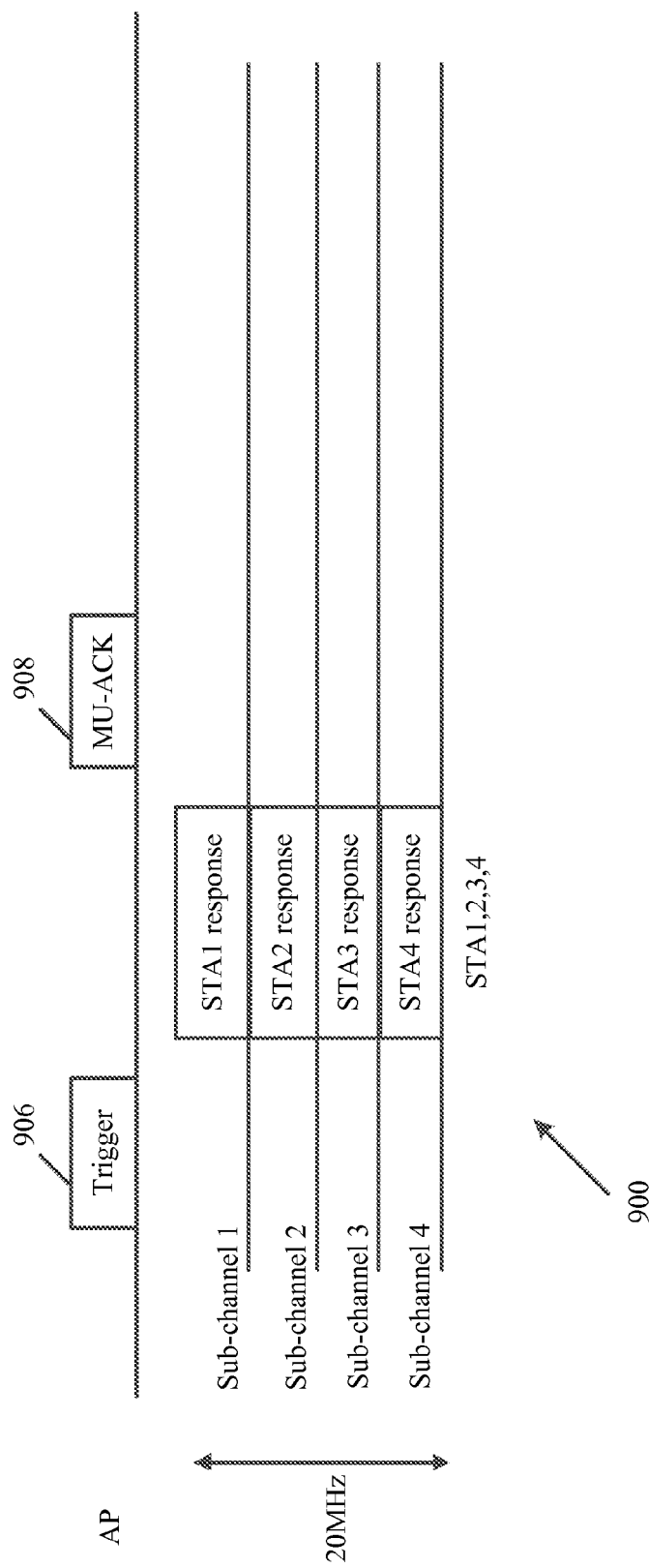
FIG. 9 is a schematic illustration of a group-addressing scheme, in accordance with some demonstrative embodiments.

Reference is to FIG. 9, which schematically illustrates a group-addressing scheme 900, in accordance with some demonstrative embodiments.

In some demonstrative embodiments, group-addressing scheme 900 may be configured to address a group of multicast receiver stations using a group address. The group address may be included in a message communicated from a multicast transmitter station, e.g., multicast transmitter station 202 (FIG. 2), to a plurality of multicast receiver stations, for example, four multicast receiver stations, e.g., the stations STA1, STA2, STA3, and STA4. For example, controller 140 (FIG. 1) may be configured to control, cause, and/or trigger the multicast transmitter station implemented by device 132 (FIG. 1) to operate as one of STA1, ST2, ST3 or ST4 of FIG. 9.

In some demonstrative embodiments, as shown in FIG. 9, the multicast transmitter station may transmit a trigger frame 906 to STA1, STA2, STA3, and/or STA4.

For example, controller 110 (FIG. 1) may be configured to control, cause, and/or trigger the multicast transmitter station implemented by device 102 (FIG. 1), to process transmission of trigger frame 906, in order to trigger a MU Block ACK/ACK transmission 908 from a group of two or more multicast receiver stations of the plurality of multicast receiver stations, e.g., the plurality of multicast receiver stations implemented by devices 132, 160, 170, and/or 180 (FIG. 1).

Referring back to FIG. 1, in some demonstrative embodiments, controller 110 may be configured to control, cause, and/or trigger transmitter 104 to process transmission of the group addressed trigger frame together with a multicast frame e.g., as described above with reference to FIG. 7.

In other demonstrative embodiments, controller 110 may be configured to control, cause, and/or trigger transmitter 104 to process transmission of a multicast frame or any other, e.g., special, frame to trigger the MU Block ACK/ACK transmission from the group of two or more devices of the plurality of devices 132, 160, 170, and/or 180, e.g., as described above.

In some demonstrative embodiments, the group addressed trigger frame may be configured to provide signaling of a resource allocation for UL OFDMA transmission, e.g., in accordance with the IEEE 802.11 Standards, e.g., an IEEE 802.1 lax standard.

In some demonstrative embodiments, controller 110 may be configured to control, cause, and/or trigger transmitter 104 to transmit the group addressed trigger frame, which may trigger an implicit MU Block ACK/ACK transmission from the group of two or more devices of the plurality of devices 132, 160, 170, and/or 180, for example, as a priority one packet after receiving the group addressed trigger frame.

In some demonstrative embodiments, devices 132, 160, 170, and/or 180 may also transmit any other data packets, for example, if devices 132, 160, 170, and/or 180 do not currently have any MU ACK transmission to send.

For example, devices 132, 160, 170, and/or 180 may transmit other data packets due to an error in reception of the multicast transmission, e.g., to achieve improved utilization of the bandwidth.

In some demonstrative embodiments, controller 110 may be configured to control, cause, and/or trigger transmitter 104 to process transmission of multiple group addressed trigger frames, for example, if the number of the multicast receiver stations is larger than a number of available sub-channels.

In some demonstrative embodiments, controller 110 may be configured to control, cause, and/or trigger transmitter 104 to select not to trigger the MU ACK transmission from a group of one or more devices in the group of devices assigned to a multicast, for example, if controller 110 selects to transmit the multicast transmission only to a subset of devices in the group of devices assigned to the multicast group.

For example, transmitter 104 may transmit the multicast transmission only to devices 160, 170, and/or 180, for example, if controller 110 selects not to form another group inside the a group of devices, e.g., including devices 132, 160, 170, and/or 180, assigned to the multicast group.

In some demonstrative embodiments, devices 102, 132, 160, 170, and/or 180 may be configured to support a Retransmission under the group addressing scheme, e.g., as described below.

In some demonstrative embodiments, controller 110 may be configured to control, cause, and/or trigger transmitter 104 to process retransmission of the multicast frame, e.g., after decoding the MU ACK transmission from multicast receiver stations.

In some demonstrative embodiments, controller 110 may be configured to control, cause, and/or trigger transmitter 104 to process transmission of the group addressed trigger frame only to one or more devices of the multicast receiver stations, from which an acknowledgement of receipt of the multicast frame was not successfully received.

In some demonstrative embodiments, controller 110 may be configured to maintain a list of the multicast receiver stations, which failed to respond with the acknowledgement for a particular multicast frame.

Figure 10:
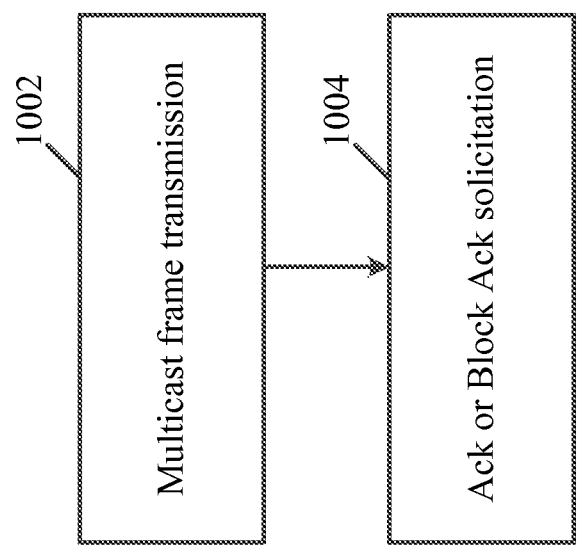
FIG. 10 is a schematic flow-chart illustration of a method of multicast communication, in accordance with some demonstrative embodiments.

Reference is made to FIG. 10, which schematically illustrates a flowchart of a method of multicast communication, in accordance with some demonstrative embodiments. For example, one or more of the operations of the method of FIG. 10 may be performed by one or more elements of a system, e.g., system 100 (FIG. 1); a wireless communication device, e.g., wireless communication devices 102, 132, 160, 170, and/or 180 (FIG. 1); a radio, e.g., radio 184 and/or radio 194 (FIG. 1); a controller, e.g., controller 110 and/or controller 140 (FIG. 1); and/or a message processor, e.g., message processor 111 and/or message processor 142 (FIG. 1).

As shown in block 1002, the method may include communicating a multicast transmission. For example, device 102 (FIG. 1) may transmit one or more multicast transmissions, e.g., as described above with reference to FIGS. 3, 4, 5, 6 and/or 7.

As shown in block 1004, the method may include soliciting a MU Block ACK/ACK transmission. For example, device 102 (FIG. 1) may solicit one or more MU Block ACK/ACK transmissions, e.g., after communicating the multicast transmission.

In some demonstrative embodiments, in a first scheme ("scheme 1"), the MU Block ACK/ACK may follow right after the multicast transmission, e.g., as described above with reference to FIG. 3.

In other embodiments, in a second scheme ("scheme 2"), the MU Block ACK/ACK may be solicited, for example, by a trigger frame, e.g., as described above with reference to FIGS. 4, 5, and/or 6.

In some demonstrative embodiments, scheme 1 and scheme 2 may be combined, for example, to enable using scheme 2 multiple times, for example, to solicit all the MU Block ACKs/ACKs, e.g., as discussed above with reference to FIGS. 4, 5, and/or 6.

Figure 11:
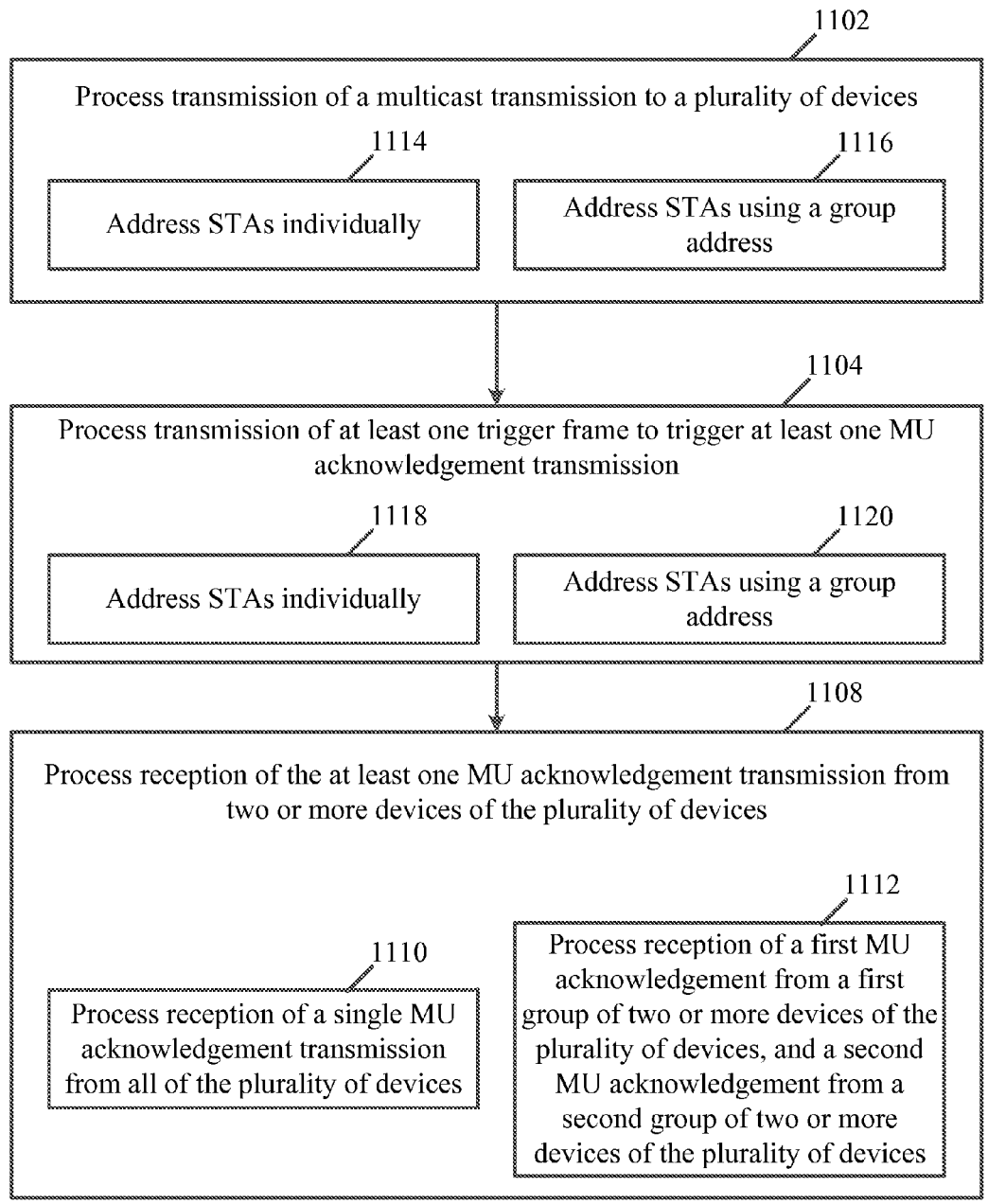
FIG. 11 is a schematic flow-chart illustration of a method of multicast communication, in accordance with some demonstrative embodiments.

Reference is made to FIG. 11, which schematically illustrates a method of processing transmission of a multicast communication, in accordance with some demonstrative embodiments. In some demonstrative embodiments, one or more of the operations of the method of FIG. 11 may be performed by one or more elements of a system, e.g., system 100 (FIG. 1); a wireless communication device, e.g., wireless communication devices 102, 132, 160, 170, and/or 180 (FIG. 1); a radio, e.g., radio 184 and/or radio 194 (FIG. 1); a controller, e.g., controller 110 and/or controller 140 (FIG. 1); and/or a message processor, e.g., message processor 111 and/or message processor 142 (FIG. 1).

As indicated at block 1102, the method may include processing transmission of a multicast transmission to a plurality of devices. For example, device 102 (FIG. 1) may process transmission of the multicast transmission to devices 132, 160, 170, and/or 180 (FIG. 1), e.g., as described above.

As indicated at block 1114, processing transmission of the multicast transmission to the plurality of devices may include individually addressing the plurality of devices. For example, device 102 (FIG. 1) may individually address devices 132, 160, 170, and/or 180 (FIG. 1), e.g., as described above.

As indicated at block 1116, processing transmission of the multicast transmission to the plurality of devices may include addressing the plurality of devices using a group address. For example, device 102 (FIG. 1) may address devices 132, 160, 170, and/or 180 (FIG. 1) using a group address, e.g., as described above.

As indicated at block 1104, the method may include processing transmission of at least one trigger frame to trigger at least one MU acknowledgment transmission. For example, device 102 (FIG. 1) may process transmission of the at least one trigger frame to trigger the at least one MU acknowledgment transmission, e.g., as described above.

As indicated at block 1118, processing transmission of the at least one trigger frame to trigger the at least one MU acknowledgment transmission may include individually addressing the plurality of devices. For example, device 102 (FIG. 1) may individually address devices 132, 160, 170, and/or 180 (FIG. 1), e.g., as described above.

As indicated at block 1120, processing transmission of the at least one trigger frame to trigger the at least one MU acknowledgment transmission may include addressing the plurality of devices using a group address. For example, device 102 (FIG. 1) may address devices 132, 160, 170, and/or 180 (FIG. 1) using a group address, e.g., as described above.

As indicated at block 1108, the method may include processing reception of the at least one MU acknowledgement transmission from two or more devices of the plurality of devices. For example, device 102 (FIG. 1) may process reception of the at least one MU acknowledgement transmission from two or more of devices 132, 160, 170, and/or 180 (FIG. 1), e.g., as described above.

As indicated at block 1110, processing reception of the at least one MU acknowledgement transmission may include processing reception of a single MU acknowledgement transmission from all of the plurality of devices. For example, device 102 (FIG. 1) may process reception of a single MU acknowledgement transmission from all of devices 132, 160, 170, and/or 180 (FIG. 1), e.g., as described above.

As indicated at block 1112, processing reception of the at least one MU acknowledgement transmission may include processing reception of a first MU acknowledgement from a first group of two or more devices of the plurality of devices, and a second MU acknowledgement from a second group of two or more devices of the plurality of devices. For example, device 102 (FIG. 1) may process reception of a first MU acknowledgement from devices 132 and 160 (FIG. 1), and a second MU acknowledgement from devices 170 and 180 (FIG. 1), e.g., as described above.

Figure 12:
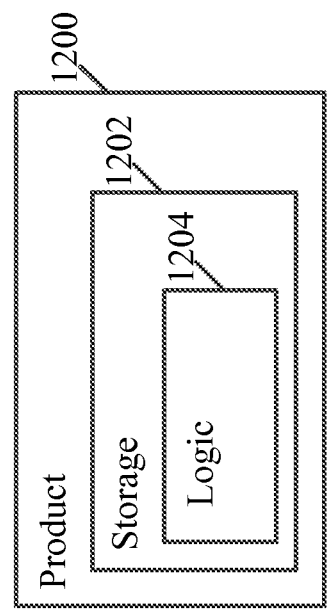
FIG. 12 is a schematic illustration of a product, in accordance with some demonstrative embodiments.

Reference is made to FIG. 12, which schematically illustrates a product of manufacture 1200, in accordance with some demonstrative embodiments. Product 1200 may include a non-transitory machine-readable storage medium 1202 to store logic 1204, which may be used, for example, to perform at least part of the functionality of device 102 (FIG. 1), device 132 (FIG. 1), device 160 (FIG. 1), device 170 (FIG. 1), device 180 (FIG. 1), radio 184 (FIG. 1), radio 194 (FIG. 1), transmitter 104 (FIG. 1), transmitter 134 (FIG. 1), receiver 106 (FIG. 1), receiver 136 (FIG. 1), controller 110 (FIG. 1), controller 140 (FIG. 1), message processor 111

(FIG. 1), and/or message processor 141 (FIG. 1), and/or to perform one or more operations described above with reference to FIGS. 2, 3, 4, 5, 6, 7, 8, 9, 10 and/.or 11, and/or one or more other operations described herein. The phrase "non-transitory machine-readable medium" is directed to include all computer-readable media, with the sole exception being a transitory propagating signal.

In some demonstrative embodiments, product 1200 and/or machine-readable storage medium 1202 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1204 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1204 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a wireless device to process transmission of a multicast transmission to a plurality of devices; and process reception of at least one Multi-User (MU) acknowledgement transmission from two or more devices of the plurality of devices, the MU acknowledgement transmission to acknowledge receipt of the multicast transmission by the two or more devices.

Example 2 includes the subject matter of Example 1, and optionally, wherein the apparatus is configured to cause the wireless device to process reception of a single MU acknowledgement transmission from all of the plurality of devices.

Example 3 includes the subject matter of Example 1, and optionally, wherein the apparatus is configured to cause the wireless device to process reception of at least first and second MU acknowledgement transmissions, the first MU acknowledgement from a first group of two or more devices of the plurality of devices, and the second MU acknowledgement from a second group of two or more devices of the plurality of devices.

Example 4 includes the subject matter of any one of Examples 1-3, and optionally, wherein the apparatus is configured to cause the wireless device to process transmission of at least one trigger frame to trigger the at least one MU acknowledgment transmission.

Example 5 includes the subject matter of Example 4, and optionally, wherein the apparatus is configured to cause the wireless device to subsequent to the multicast transmission, process reception of a first MU acknowledgment transmission from a first group of two or more devices of the plurality of devices; and subsequent to the first MU acknowledgement transmission, process transmission of a trigger frame to trigger a second MU acknowledgement from a second group of two or more devices of the plurality of devices.

Example 6 includes the subject matter of Example 4, and optionally, wherein the apparatus is configured to cause the wireless device to process transmission of at least first and second trigger frames, the first trigger frame to trigger a first MU acknowledgement from a first group of two or more devices of the plurality of devices, and the second trigger frame to trigger a second MU acknowledgement from a second group of two or more devices of the plurality of devices.

Example 7 includes the subject matter of any one of Examples 4-6, and optionally, wherein the multicast transmission comprises one or more multicast frames followed by the at least one multicast trigger frame.

Example 8 includes the subject matter of any one of Examples 4-7, and optionally, wherein the trigger frame comprises a group addressed trigger frame to trigger a MU acknowledgement transmission from a group of two or more devices of the plurality of devices, the group addressed trigger frame comprising a group address of the group of two or more devices.

Example 9 includes the subject matter of any one of Examples 1-7, and optionally, wherein the apparatus is configured to cause the wireless device to process transmission of a message including two or more addresses of respective ones of the two or more devices, the MU acknowledgement transmission including two or more acknowledgements over two or more respective sub-channels, the two or more sub-channels being based on an order of the two or more addresses.

Example 10 includes the subject matter of Example 9, and optionally, wherein the apparatus is configured to cause the wireless device to process transmission of the two or more addresses as part of the multicast transmission.

Example 11 includes the subject matter of Example 9, and optionally, wherein the apparatus is configured to cause the wireless device to process transmission of the two or more addresses as part of a trigger frame subsequent to the multicast transmission.

Example 12 includes the subject matter of any one of Examples 1-11, and optionally, wherein the MU acknowledgement transmission comprises a MU normal acknowledgement transmission or a MU Block acknowledgement transmission.

Example 13 includes the subject matter of any one of Examples 1-12, and optionally, wherein the MU acknowledgement transmission comprises an Orthogonal Frequency Division Multiple Access (OFDMA) transmission.

Example 14 includes the subject matter of any one of Examples 1-13, and optionally, comprising one or more antennas, a radio, a memory and a processor.

Example 15 includes a system comprising a wireless communication device, the wireless communication device comprising one or more antennas; a memory; a processor; and a radio to transmit a multicast transmission to a plurality of devices, and to receive at least one Multi-User (MU) acknowledgement transmission from two or more devices of the plurality of devices, the MU acknowledgement transmission to acknowledge receipt of the multicast transmission by the two or more devices.

Example 16 includes the subject matter of Example 15, and optionally, wherein the wireless device is configured to process reception of a single MU acknowledgement transmission from all of the plurality of devices.

Example 17 includes the subject matter of Example 15, and optionally, wherein the wireless device is configured to process reception of at least first and second MU acknowledgement transmissions, the first MU acknowledgement from a first group of two or more devices of the plurality of devices, and the second MU acknowledgement from a second group of two or more devices of the plurality of devices.

Example 18 includes the subject matter of any one of Examples 15-17, and optionally, wherein the wireless device is configured to process transmission of at least one trigger frame to trigger the at least one MU acknowledgment transmission.

Example 19 includes the subject matter of Example 18, and optionally, wherein the wireless device is configured to subsequent to the multicast transmission, process reception of a first MU acknowledgment transmission from a first group of two or more devices of the plurality of devices; and subsequent to the first MU acknowledgement transmission, process transmission of a trigger frame to trigger a second MU acknowledgement from a second group of two or more devices of the plurality of devices.

Example 20 includes the subject matter of Example 18, and optionally, wherein the wireless device is configured to process transmission of at least first and second trigger frames, the first trigger frame to trigger a first MU acknowledgement from a first group of two or more devices of the plurality of devices, and the second trigger frame to trigger a second MU acknowledgement from a second group of two or more devices of the plurality of devices.

Example 21 includes the subject matter of any one of Examples 18-20, and optionally, wherein the multicast transmission comprises one or more multicast frames followed by the at least one multicast trigger frame.

Example 22 includes the subject matter of any one of Examples 18-21, and optionally, wherein the trigger frame comprises a group addressed trigger frame to trigger a MU acknowledgement transmission from a group of two or more devices of the plurality of devices, the group addressed trigger frame comprising a group address of the group of two or more devices.

Example 23 includes the subject matter of any one of Examples 15-21, and optionally, wherein the wireless device is configured to process transmission of a message including two or more addresses of respective ones of the two or more devices, the MU acknowledgement transmission including two or more acknowledgements over two or more respective sub-channels, the two or more sub-channels being based on an order of the two or more addresses.

Example 24 includes the subject matter of Example 23, and optionally, wherein the wireless device is configured to process transmission of the two or more addresses as part of the multicast transmission.

Example 25 includes the subject matter of Example 23, and optionally, wherein the wireless device is configured to process transmission of the two or more addresses as part of a trigger frame subsequent to the multicast transmission.

Example 26 includes the subject matter of any one of Examples 15-25, and optionally, wherein the MU acknowledgement transmission comprises a MU normal acknowledgement transmission or a MU Block acknowledgement transmission.

Example 27 includes the subject matter of any one of Examples 15-26, and optionally, wherein the MU acknowledgement transmission comprises an Orthogonal Frequency Division Multiple Access (OFDMA) transmission.

Example 28 includes a method to be performed at a wireless communication device, the method comprising transmitting a multicast transmission to a plurality of devices; and receiving at least one Multi-User (MU) acknowledgement transmission from two or more devices of the plurality of devices, the MU acknowledgement transmission to acknowledge receipt of the multicast transmission by the two or more devices.

Example 29 includes the subject matter of Example 28, and optionally, comprising processing reception of a single MU acknowledgement transmission from all of the plurality of devices.

Example 30 includes the subject matter of Example 28, and optionally, comprising processing reception of at least first and second MU acknowledgement transmissions, the first MU acknowledgement from a first group of two or more devices of the plurality of devices, and the second MU acknowledgement from a second group of two or more devices of the plurality of devices.

Example 31 includes the subject matter of any one of Examples 28-30, and optionally, comprising processing transmission of at least one trigger frame to trigger the at least one MU acknowledgment transmission.

Example 32 includes the subject matter of Example 31, and optionally, comprising subsequent to the multicast transmission, processing reception of a first MU acknowledgment transmission from a first group of two or more devices of the plurality of devices; and subsequent to the first MU acknowledgement transmission, processing transmission of a trigger frame to trigger a second MU acknowledgement from a second group of two or more devices of the plurality of devices.

Example 33 includes the subject matter of Example 31, and optionally, comprising processing transmission of at least first and second trigger frames, the first trigger frame to trigger a first MU acknowledgement from a first group of two or more devices of the plurality of devices, and the second trigger frame to trigger a second MU acknowledgement from a second group of two or more devices of the plurality of devices.

Example 34 includes the subject matter of any one of Examples 31-33, and optionally, wherein the multicast transmission comprises one or more multicast frames followed by the at least one multicast trigger frame.

Example 35 includes the subject matter of any one of Examples 31-34, and optionally, wherein the trigger frame comprises a group addressed trigger frame to trigger a MU acknowledgement transmission from a group of two or more devices of the plurality of devices, the group addressed trigger frame comprising a group address of the group of two or more devices.

Example 36 includes the subject matter of any one of Examples 28-34, and optionally, comprising processing transmission of a message including two or more addresses of respective ones of the two or more devices, the MU acknowledgement transmission including two or more acknowledgements over two or more respective sub-channels, the two or more sub-channels being based on an order of the two or more addresses.

Example 37 includes the subject matter of Example 36, and optionally, comprising processing transmission of the two or more addresses as part of the multicast transmission.

Example 38 includes the subject matter of Example 36, and optionally, comprising processing transmission of the two or more addresses as part of a trigger frame subsequent to the multicast transmission.

Example 39 includes the subject matter of any one of Examples 28-38, and optionally, wherein the MU acknowledgement transmission comprises a MU normal acknowledgement transmission or a MU Block acknowledgement transmission.

Example 40 includes the subject matter of any one of Examples 28-39, and optionally, wherein the MU acknowledgement transmission comprises an Orthogonal Frequency Division Multiple Access (OFDMA) transmission.

Example 41 includes a product including one or more tangible computer-readable non-transitory storage media comprising computer-executable instructions operable to, when executed by at least one computer processor, enable the at least one computer processor to implement one or more operations at a wireless communication device, the operations comprising transmitting a multicast transmission to a plurality of devices; and receiving at least one Multi-User (MU) acknowledgement transmission from two or more devices of the plurality of devices, the MU acknowledgement transmission to acknowledge receipt of the multicast transmission by the two or more devices.

Example 42 includes the subject matter of Example 41, and optionally, wherein the operations comprise processing reception of a single MU acknowledgement transmission from all of the plurality of devices.

Example 43 includes the subject matter of Example 41, and optionally, wherein the operations comprise processing reception of at least first and second MU acknowledgement transmissions, the first MU acknowledgement from a first group of two or more devices of the plurality of devices, and the second MU acknowledgement from a second group of two or more devices of the plurality of devices.

Example 44 includes the subject matter of any one of Examples 41-43, and optionally, wherein the operations comprise processing transmission of at least one trigger frame to trigger the at least one MU acknowledgment transmission.

Example 45 includes the subject matter of Example 44, and optionally, wherein the operations comprise subsequent to the multicast transmission, processing reception of a first MU acknowledgment transmission from a first group of two or more devices of the plurality of devices; and subsequent to the first MU acknowledgement transmission, processing transmission of a trigger frame to trigger a second MU acknowledgement from a second group of two or more devices of the plurality of devices.

Example 46 includes the subject matter of Example 44, and optionally, wherein the operations comprise processing transmission of at least first and second trigger frames, the first trigger frame to trigger a first MU acknowledgement from a first group of two or more devices of the plurality of devices, and the second trigger frame to trigger a second MU acknowledgement from a second group of two or more devices of the plurality of devices.

Example 47 includes the subject matter of any one of Examples 44-46, and optionally, wherein the multicast transmission comprises one or more multicast frames followed by the at least one multicast trigger frame.

Example 48 includes the subject matter of any one of Examples 44-47, and optionally, wherein the trigger frame comprises a group addressed trigger frame to trigger a MU acknowledgement transmission from a group of two or more devices of the plurality of devices, the group addressed trigger frame comprising a group address of the group of two or more devices.

Example 49 includes the subject matter of any one of Examples 41-47, and optionally, wherein the operations comprise processing transmission of a message including two or more addresses of respective ones of the two or more devices, the MU acknowledgement transmission including two or more acknowledgements over two or more respective sub-channels, the two or more sub-channels being based on an order of the two or more addresses.

Example 50 includes the subject matter of Example 49, and optionally, wherein the operations comprise processing transmission of the two or more addresses as part of the multicast transmission.

Example 51 includes the subject matter of Example 49, and optionally, wherein the operations comprise processing transmission of the two or more addresses as part of a trigger frame subsequent to the multicast transmission.

Example 52 includes the subject matter of any one of Examples 41-51, and optionally, wherein the MU acknowledgement transmission comprises a MU normal acknowledgement transmission or a MU Block acknowledgement transmission.

Example 53 includes the subject matter of any one of Examples 41-52, and optionally, wherein the MU acknowledgement transmission comprises an Orthogonal Frequency Division Multiple Access (OFDMA) transmission.

Example 54 includes an apparatus of wireless communication by a wireless device, the apparatus comprising means for transmitting a multicast transmission to a plurality of devices; and means for receiving at least one Multi-User (MU) acknowledgement transmission from two or more devices of the plurality of devices, the MU acknowledgement transmission to acknowledge receipt of the multicast transmission by the two or more devices.

Example 55 includes the subject matter of Example 54, and optionally, comprising means for processing reception of a single MU acknowledgement transmission from all of the plurality of devices.

Example 56 includes the subject matter of Example 54, and optionally, comprising means for processing reception of at least first and second MU acknowledgement transmissions, the first MU acknowledgement from a first group of two or more devices of the plurality of devices, and the second MU acknowledgement from a second group of two or more devices of the plurality of devices.

Example 57 includes the subject matter of any one of Examples 54-56, and optionally, comprising means for processing transmission of at least one trigger frame to trigger the at least one MU acknowledgment transmission.

Example 58 includes the subject matter of Example 57, and optionally, comprising means for subsequent to the multicast transmission, processing reception of a first MU acknowledgment transmission from a first group of two or more devices of the plurality of devices; and subsequent to the first MU acknowledgement transmission, processing transmission of a trigger frame to trigger a second MU acknowledgement from a second group of two or more devices of the plurality of devices.

Example 59 includes the subject matter of Example 57, and optionally, comprising means for processing transmission of at least first and second trigger frames, the first trigger frame to trigger a first MU acknowledgement from a first group of two or more devices of the plurality of devices, and the second trigger frame to trigger a second MU acknowledgement from a second group of two or more devices of the plurality of devices.

Example 60 includes the subject matter of any one of Examples 57-59, and optionally, wherein the multicast transmission comprises one or more multicast frames followed by the at least one multicast trigger frame.

Example 61 includes the subject matter of any one of Examples 57-60, and optionally, wherein the trigger frame comprises a group addressed trigger frame to trigger a MU acknowledgement transmission from a group of two or more devices of the plurality of devices, the group addressed trigger frame comprising a group address of the group of two or more devices.

Example 62 includes the subject matter of any one of Examples 54-60, and optionally, comprising means for processing transmission of a message including two or more addresses of respective ones of the two or more devices, the MU acknowledgement transmission including two or more acknowledgements over two or more respective sub-channels, the two or more sub-channels being based on an order of the two or more addresses.

Example 63 includes the subject matter of Example 62, and optionally, comprising means for processing transmission of the two or more addresses as part of the multicast transmission.

Example 64 includes the subject matter of Example 62, and optionally, comprising means for processing transmission of the two or more addresses as part of a trigger frame subsequent to the multicast transmission.

Example 65 includes the subject matter of any one of Examples 54-64, and optionally, wherein the MU acknowledgement transmission comprises a MU normal acknowledgement transmission or a MU Block acknowledgement transmission.

Example 66 includes the subject matter of any one of Examples 54-65, and optionally, wherein the MU acknowledgement transmission comprises an Orthogonal Frequency Division Multiple Access (OFDMA) transmission.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry configured to cause a wireless device to:
   process transmission of a multicast transmission to a plurality of devices; and
   process reception of at least one Multi-User (MU) acknowledgement transmission from two or more devices of the plurality of devices, the MU acknowledgement transmission to acknowledge receipt of the multicast transmission by the two or more devices, the apparatus configured to cause the wireless device to process transmission of a message including two or more addresses of respective ones of the two or more devices, the MU acknowledgement transmission including two or more acknowledgements over two or more respective sub-channels, the two or more sub-channels are based on an order of the two or more addresses.

2. The apparatus of claim 1 configured to cause the wireless device to process reception of a single MU acknowledgement transmission from all of the plurality of devices.

3. The apparatus of claim 1 configured to cause the wireless device to process reception of at least first and second MU acknowledgement transmissions, the first MU acknowledgement from a first group of two or more devices of the plurality of devices, and the second MU acknowledgement from a second group of two or more devices of the plurality of devices.

4. The apparatus of claim 1 configured to cause the wireless device to process transmission of at least one trigger frame to trigger the at least one MU acknowledgment transmission.

5. The apparatus of claim 4 configured to cause the wireless device to:
   subsequent to the multicast transmission, process reception of a first MU acknowledgment transmission from a first group of two or more devices of the plurality of devices; and
   subsequent to the first MU acknowledgement transmission, process transmission of a trigger frame to trigger a second MU acknowledgement transmission from a second group of two or more devices of said plurality of devices.

6. The apparatus of claim 4 configured to cause the wireless device to process transmission of at least first and second trigger frames, the first trigger frame to trigger a first MU acknowledgement from a first group of two or more devices of said plurality of devices, and the second trigger frame to trigger a second MU acknowledgement from a second group of two or more devices of said plurality of devices.

7. The apparatus of claim 4, wherein the multicast transmission comprises one or more multicast frames followed by the at least one multicast trigger frame.

8. The apparatus of claim 1 configured to cause the wireless device to process transmission of the two or more addresses as part of the multicast transmission.

9. The apparatus of claim 1 configured to cause the wireless device to process transmission of the two or more addresses as part of a trigger frame subsequent to the multicast transmission.

10. The apparatus of claim 1, wherein the MU acknowledgement transmission comprises a MU normal acknowledgement transmission or a MU Block acknowledgement transmission.

11. The apparatus of claim 1, wherein the MU acknowledgement transmission comprises an Orthogonal Frequency Division Multiple Access (OFDMA) transmission.

12. The apparatus of claim 1 comprising one or more antennas, a radio, a memory and a processor.

13. An apparatus comprising circuitry configured to cause a wireless device to:
process transmission of a multicast transmission to a plurality of devices;
process transmission of a group addressed trigger frame to trigger a Multi-User (MU) acknowledgement transmission from a group of two or more devices of said plurality of devices, the group addressed trigger frame comprising a group address of said group of two or more devices; and
process reception of the MU acknowledgement transmission, the MU acknowledgement transmission to acknowledge receipt of the multicast transmission by the group of two or more devices.

14. The apparatus of claim 13, wherein the MU acknowledgement transmission comprises an Orthogonal Frequency Division Multiple Access (OFDMA) transmission.

15. A system comprising a wireless communication device, the wireless communication device comprising:
one or more antennas;
a memory;
a processor; and
a radio to transmit a multicast transmission to a plurality of devices, and to receive at least one Multi-User (MU) acknowledgement transmission from two or more devices of the plurality of devices, the MU acknowledgement transmission to acknowledge receipt of the multicast transmission by the two or more devices, the radio is configured to transmit a message including two or more addresses of respective ones of the two or more devices, the MU acknowledgement transmission including two or more acknowledgements over two or more respective sub-channels, the two or more sub-channels are based on an order of the two or more addresses.

16. The system of claim 15, wherein the wireless device is configured to process reception of at least first and second MU acknowledgement transmissions, the first MU acknowledgement from a first group of two or more devices of the plurality of devices, and the second MU acknowledgement from a second group of two or more devices of the plurality of devices.

17. The system of claim 15, wherein the wireless device is configured to process transmission of at least one trigger frame to trigger the at least one MU acknowledgment transmission.

18. A method to be performed at a wireless communication device, the method comprising:
transmitting a multicast transmission to a plurality of devices; and
receiving at least one Multi-User (MU) acknowledgement transmission from two or more devices of the plurality of devices, the MU acknowledgement transmission to acknowledge receipt of the multicast transmission by the two or more devices,
wherein the method comprises transmitting a message including two or more addresses of respective ones of the two or more devices, the MU acknowledgement transmission including two or more acknowledgements over two or more respective sub-channels, the two or more sub-channels are based on an order of the two or more addresses.

19. The method of claim 18 comprising processing transmission of at least one trigger frame to trigger the at least one MU acknowledgment transmission.

20. A product including one or more tangible computer-readable non-transitory storage media comprising computer-executable instructions operable to, when executed by at least one computer processor, enable the at least one computer processor to cause a wireless communication device to:
transmit a multicast transmission to a plurality of devices; and
receive at least one Multi-User (MU) acknowledgement transmission from two or more devices of the plurality of devices, the MU acknowledgement transmission to acknowledge receipt of the multicast transmission by the two or more devices, the instructions, when executed, cause the wireless communication device to transmit a message including, two or more addresses of respective ones of the two or more devices, the MU acknowledgement transmission including two or more acknowledgements over two or more respective sub-channels, the two or more sub-channels are based on an order of the two or more addresses.

21. The product of claim 20, wherein the instructions, when executed, cause the wireless communication device to process reception of a single MU acknowledgement transmission from all of the plurality of devices.

22. The product of claim 20, wherein the instructions, when executed, cause the wireless communication device to process reception of at least first and second MU acknowledgement transmissions, the first MU acknowledgement from a first group of two or more devices of the plurality of devices, and the second MU acknowledgement from a second group of two or more devices of the plurality of devices.

23. The product of claim 20, wherein the instructions, when executed, cause the wireless communication device to process transmission of at least one trigger frame to trigger the at least one MU acknowledgment transmission.

24. A product including one or more tangible computer-readable non-transitory storage media comprising computer-executable instructions operable to, when executed by at least one computer processor, enable the at least one computer processor to cause a wireless communication device to:
transmit a multicast transmission to a plurality of devices;
transmit a group addressed trigger frame to trigger a Multi-User (MU) acknowledgement transmission from a group of two or more devices of said plurality of devices, the group addressed trigger frame comprising a group address of said group of two or more devices; and
receive the MU acknowledgement transmission, the MU acknowledgement transmission to acknowledge receipt of the multicast transmission by the group of two or more devices.

25. The product of claim 24, wherein the MU acknowledgement transmission comprises an Orthogonal Frequency Division Multiple Access (OFDMA) transmission.

* * * * *

UNITED STATES PATENT AND TRADEMARK OFFICE
CERTIFICATE OF CORRECTION

PATENT NO. : 9,942,055 B2
APPLICATION NO. : 14/864911
DATED : April 10, 2018
INVENTOR(S) : Huang et al.

It is certified that error appears in the above-identified patent and that said Letters Patent is hereby corrected as shown below:

In the Claims

In Column 36, Line 28, in Claim 20, delete "including," and insert --including--, therefor.

Signed and Sealed this
Seventh Day of August, 2018

Andrei Iancu
*Director of the United States Patent and Trademark Office*